US006628287B1

(12) United States Patent
Duda et al.

(10) Patent No.: US 6,628,287 B1
(45) Date of Patent: Sep. 30, 2003

(54) METHOD AND APPARATUS FOR CONSISTENT, RESPONSIVE, AND SECURE DISTRIBUTED SIMULATION IN A COMPUTER NETWORK ENVIRONMENT

(75) Inventors: Kenneth J. Duda, Hillsborough, CA (US); William D. Harvey, Palo Alto, CA (US)

(73) Assignee: There, Inc., Menlo Park, CA (US)

( * ) Notice: Subject to any disclaimer, the term of this patent is extended or adjusted under 35 U.S.C. 154(b) by 0 days.

(21) Appl. No.: 09/482,218

(22) Filed: Jan. 12, 2000

(51) Int. Cl.[7] .................................. G06T 15/70
(52) U.S. Cl. ..................... 345/475; 345/474; 345/752; 345/757; 345/758; 703/21; 709/200
(58) Field of Search .................. 345/473, 474, 345/475, 757, 758, 419, 752; 709/200–253; 703/21–25

(56) References Cited

U.S. PATENT DOCUMENTS

| 4,473,889 A | 9/1984 | Ross |
| 4,570,930 A | 2/1986 | Matheson |
| 5,261,094 A | 11/1993 | Everson et al. |
| 5,329,619 A | 7/1994 | Page et al. |
| 5,423,037 A | 6/1995 | Hvasshovd |
| 5,434,994 A | 7/1995 | Shaheen et al. |
| 5,461,608 A | 10/1995 | Yoshiyama |
| 5,538,255 A | 7/1996 | Barker |
| 5,547,202 A | 8/1996 | Tsumura |
| 5,561,769 A | 10/1996 | Kumar et al. |
| 5,586,257 A | 12/1996 | Perlman |
| 5,586,937 A | 12/1996 | Menashe |
| 5,630,757 A | 5/1997 | Gagin et al. |
| 5,668,950 A | 9/1997 | Kikuchi et al. |
| 5,685,775 A | 11/1997 | Bakoglu et al. |
| 5,838,909 A | * 11/1998 | Roy et al. .................. 709/209 |
| 6,006,254 A | * 12/1999 | Waters et al. ............... 709/205 |
| 6,040,841 A | * 3/2000 | Cohen et al. ............... 345/473 |
| 6,324,495 B1 | * 11/2001 | Steinman ..................... 703/17 |

OTHER PUBLICATIONS

Azer Bestavros et al., "Application–Level Document Caching in the Internet", IEEE, pp. 166–172, Boston, Massachusetts, 1995.

* cited by examiner

Primary Examiner—Mark Zimmerman
Assistant Examiner—Kimbinh T. Nguyen
(74) Attorney, Agent, or Firm—Blakely, Sokoloff, Taylor & Zafman LLP; Jordan M. Becker

(57) ABSTRACT

A set of mechanisms provides consistency, responsiveness, and integrity, to allow high-realism in a distributed network simulation environment. Consistency is achieved by executing the same computation with the same inputs on multiple machines. Responsiveness is achieved by executing the parts of the computation that affect the user's object earlier on the user's machine than on the server for the user's object. Integrity is achieved by executing all computations authoritatively on the server. The ability to run different parts of a shared computation at varying times on different machines is provided.

74 Claims, 16 Drawing Sheets

METHOD AND APPARATUS FOR CONSISTENT, RESPONSIVE, AND SECURE DISTRIBUTED SIMULATION IN A COMPUTER NETWORK ENVIRONMENT

FIELD OF THE INVENTION

The present invention pertains to computer simulation in a network environment. More particularly, the present invention relates to providing computer simulation with high consistency, responsiveness, and security in a distributed network environment.

BACKGROUND OF THE INVENTION

In discrete event simulation, a machine performing simulation, such as a computer system, maintains the state of various simulation objects that can be displayed on a display device, such as a computer monitor. These objects may represent real-world objects, such as people, vehicles, etc., which may be controlled by a human user. The state of an object may include the object's display position on a display device, its physical orientation, size, shape, color, etc. The machine normally evolves the state of an object over time based on three factors: 1) user input; 2) object-internal rules for advancing the object's state (which may be general laws of physics and/or object-specific behaviors); and 3) rules for interaction with other objects (which again may be based on laws of physics or may be specific to the interacting objects).

In distributed discrete event simulation, each object may be known to multiple machines, each with its own version of the object's state. Distributed simulation presents three challenges. First, because of variable communication delay, different machines become aware of events affecting an object at different points in (physical) time. There is unavoidable delay between the machine where a command is issued and another user's machine where the affected object is being observed. Thus, a major challenge of distributed simulation is providing a consistent view of simulation state across all machines.

Second, mechanisms that improve consistency generally involve reaching agreement about the progress of simulation before displaying it to the user. This delay may result in poor responsiveness, i.e., excessive delay between when the user issues a command and when the response is apparent.

Third, attempting to improve responsiveness by granting the user's machine authority over the state the user can influence may result in an integrity problem: the user may modify the program on his machine to corrupt the simulation state over which his machine has authority, degrading the experience for other users.

SUMMARY OF THE INVENTION

The present invention includes a method and apparatus that provide consistency, responsiveness, and integrity for a network-based simulation of physical objects. Among other features, the ability to run different parts of a shared computation at varying times on different machines is provided.

In particular, the present invention includes a method and apparatus for maintaining a simulation distributed on a network and characterized by multiple objects. A true state of each of the objects is maintained on a server on the network. User commands are sent from a client on the network to the server and are associated with timestamps. Essentially identical computations of object state are performed on the server and the client to achieve essentially the same result on the server and the client. However, corresponding computations on the client and the server may be performed at different times.

In another aspect of the present invention, the simulation is advanced according to global virtual time. In a local processing system, at each of multiple points in global virtual time, a state of one of the objects is computed for a time that differs from the current global virtual time. The object is displayed according to each computed state.

In yet another aspect of the present invention, a repair message is received from a remote processing system, such as a server on the network. The repair message includes an indication of a true state of an object and a time value associated with the true state. Previously computed states of the object are then recomputed based on the repair message.

In still another aspect of the present invention, a time frame for a current state of an object is determined based on a proximity of the object to another object with which the object can interact.

In another aspect of the present invention, a frame of reference of an object is determined as a region in which the object can exist. A determination is made of when the object contacts the frame of reference. When the object contacts the frame of reference, the position of the object is transformed from an original position associated with a first time frame to a new position associated with a time frame of the frame of reference.

In another aspect of the present invention, objects are simulated in accordance with a hierarchical classification system that restricts the set of objects that any given object can affect.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
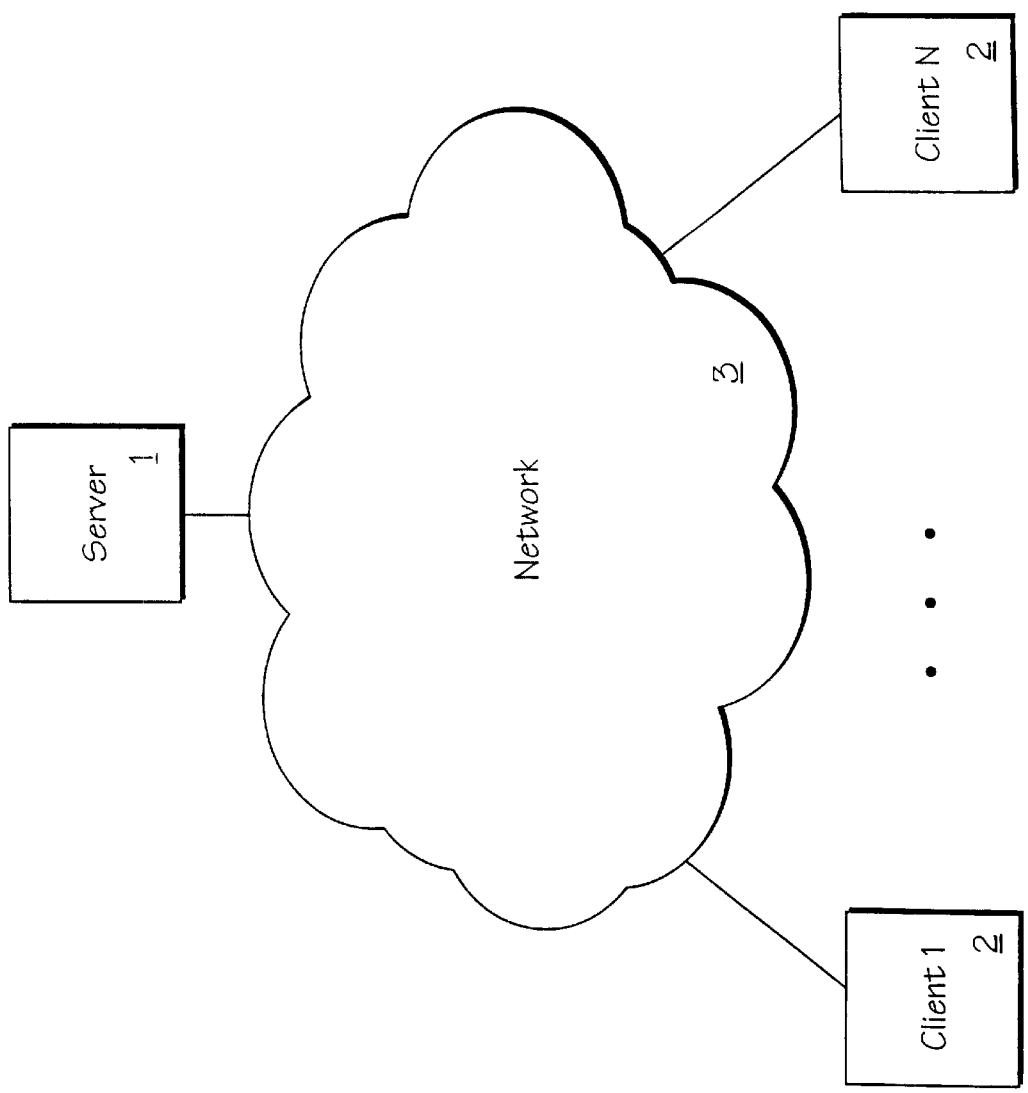
FIG. 1 illustrates a network environment in which the present invention may be implemented.

A method and apparatus for consistent, responsive, and secure distributed simulation in a computer network environment are described. As will be described in greater detail below, a set of mechanisms provides consistency, responsiveness, and integrity, to allow high-realism in a distributed network simulation environment. Consistency is achieved by executing the same computation using the same inputs on multiple machines on the network, i.e., on a server and one or more clients. Responsiveness is achieved by executing the parts of the computation that affect a user's object earlier on the user's (client) machine than on the server for the user's object. Integrity is achieved by executing all computations authoritatively on the server. The ability to run different parts of a shared computation at varying times on different machines is provided.

Note that in this description, references to "one embodiment" or "an embodiment" mean that the feature being referred to is included in at least one embodiment of the present invention. Further, separate references to "one embodiment" in this description do not necessarily refer to the same embodiment; however, such embodiments also are not mutually exclusive.

As will be apparent from the description which follows, the present invention may be embodied in the form of software, at least in part. That is, present invention may be carried out in a computer system (or in multiple computer systems) in response to a microprocessor executing sequences of instructions contained in a storage device. The instructions may be executed from a local memory or mass storage device and/or from one or more other remote computer systems (collectively referred to as "host computer system").

In the latter case, for example, a host computer system may transmit a sequence of instructions to the ("target") computer system in response to a message transmitted to the host computer system over a network by target computer system. As the target computer system receives the instructions via the network connection, the target computer system stores the instructions in memory. The target computer system may store the instructions for later execution or execute the instructions as they arrive over the network. In some cases, such downloaded instructions may be directly supported by the microprocessor of the target computer system. Consequently, execution of the instructions may be performed directly by the microprocessor. In other cases, the instructions may not be directly executable by the microprocessor. Under those circumstances, the instructions may be executed by causing the microprocessor to execute an interpreter that interprets the instructions or by causing the microprocessor to execute instructions which convert the received instructions to instructions which can be directly executed by the microprocessor.

In various embodiments of the present invention, hard-wired circuitry may be used in place of, or in combination with, software instructions to implement the present invention. Thus, the present invention is not limited to any specific combination of hardware circuitry and software, nor to any particular source for the instructions executed by a computer system.

Software embodying the present invention may be in the form of, for example, one or more software applications, dynamic link libraries (DLLs), implementations of Application Program Interfaces (APIs), plug-ins, etc., or a combination thereof. Portions of such software may reside in the server and each client participating in a simulation. Other portions may reside in only one platform on the network, such as in a server, or only in particular platforms on the network, as will be apparent to those skilled in the art from this description.

Software embodying the present invention may be written in a conventional programming language, such as C or C++. It may be desirable to employ an object-oriented language, such as C++.

FIG. 1 illustrates a network environment in which the present invention may be implemented. The environment includes a server 1 which is coupled to a number N of clients 2 via a network 3. It will be recognized that the server 1 and the clients 2 form part of the network 3. Although two clients 2 are shown, the number N of clients 2 is not restricted to any particular number. The server 1 and each of the clients 2 may be a conventional computer system, such as a personal computer (PC), a workstation, or even a hand-held device such as a personal digital assistant (PDA), personal information manager (PIM), a set-top box, a console game system, or the like. The network 3 may be the Internet, a campus intranet, a wide area network (WAN), a local area network (LAN), or any other type of network. However, the advantages of the present invention may be most apparent when implemented on a network which is subject to substantial latency, such as the Internet. It will also be recognized that the present invention can be applied to networks that use any of a variety of communication techniques, including datagram based networks (e.g., the Internet), connection based (e.g., X.25) networks, virtual circuit based (e.g., ATM) networks, etc.

During a simulation, each of the clients 2 maintains a set of objects, representing real-world objects, some of which are controlled by the human users of these machines. Each machine maintains the same objects, however, the states of the objects may be computed at different times on each machine. The server 1 maintains the "true" state of each object, i.e., the state which is considered to be the correct state of the object. The clients 2 are machines used by human users who control certain ones of the objects. Note that in certain embodiments, however, the server 1 may be implemented in the same machine as one or more clients 2. However, for purposes of explanation, it is henceforth assumed that the server 1 is implemented in a separate machine on the network. In addition, there may actually be more than one server 1; for example one server may maintain the true state of certain objects, while another server or servers maintain the true state of other objects or perform other server functions.

Figure 2:
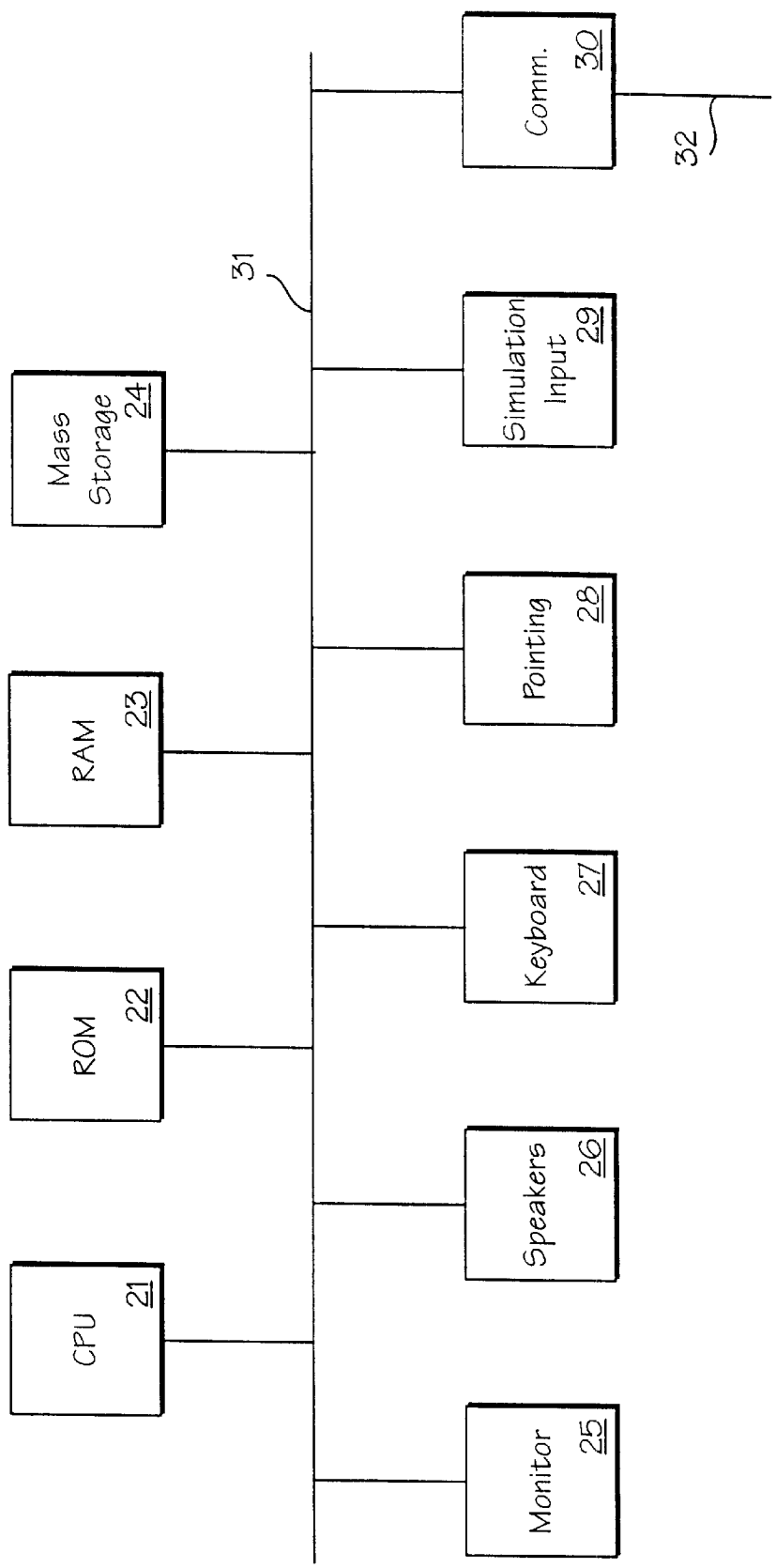
FIG. 2 is a block diagram of a computer system that may be used in the network environment of FIG. 1.

FIG. 2 is a block diagram of a processing system that may represent any of the machines shown in FIG. 1. The illustrated system includes a central processing unit (CPU) 21, which is a microprocessor, read-only memory (ROM) 22, random access memory (RAM) 23, and a mass storage device 24, each connected to a bus system 31. The bus system 31 may include one or more buses connected to each other through various bridges, controllers and/or adapters, such as are well-known in the art. For example, the bus system may include a system bus that is connected through an adapter to one or more expansion buses, such as a Peripheral Component Interconnect (PCI) bus. Also coupled to the bus system 31 are a monitor (display device) 25, audio speakers 26, a keyboard 27, a pointing device 28, a simulation input device 29, and a communication device 30.

Mass storage device 24 may include any suitable device for storing large volumes of data, such as magnetic disk or tape, magneto-optical (MO) storage device, or any of various types of Digital Versatile Disk (DVD) or compact disk ROM (CD-ROM) storage, flash memory etc. The monitor 25 may be any suitable device for displaying alphanumeric, graphical and/or video data to a user, such as a cathode ray tube (CRT), a liquid crystal display (LCD), or the like, and associated controllers. The pointing device 28 may be any suitable device for enabling a user to position a cursor or pointer on the monitor 25, such as a mouse, trackball, touchpad, joystick, or the like. The simulation input device 29 may be any device which receives user inputs to allow a user to control objects in a simulation, such as a joystick or the like. Note, however, that the keyboard 27 and/or the pointing device 28 may also serve this same purpose, such that the game input device 29 may be omitted in certain embodiments. The communication device 30 may be any device suitable for enabling the computer system to communicate data with another processing system over a network via a communication link 32, such as a conventional telephone modem, a wireless modem, a cable modem, an Integrated Services Digital Network (ISDN) adapter, a Digital Subscriber Line (xDSL) adapter, an Ethernet adapter, or the like.

Note that some of these components may not be present certain embodiments, and certain embodiments may include additional or substitute components not mentioned here. For example, a server may not require components such as speakers 26 or simulation input device 29.

1. Object Model

According to the present invention, each user's (client) machine tracks the state S of an object as a series of values over a range in virtual time: S(t−k), S(t−k+1), . . . , S(t), S(t+1), . . . , S(t+k). When a user's machine creates a depiction of the simulation state, it in general does not depict all objects at the same point in virtual time. Instead, it divides the objects into two categories: 1) objects that are influenced by user commands, which are called "actors", and 2) objects that are not influenced by commands, which are called "obstacles". An actor may be, for example, an avatar. Actors are further categorized as either: 1) "pilot actors", which are actors that are influenced by local user commands, or 2) "shadow actors", which are actors that are influenced by user commands from a remote client. In accordance with the present invention, pilot actors are depicted as timeshifted ahead of global virtual time (i.e., in a later timeframe than global virtual time), while shadow actors are depicted as timeshifted behind global virtual time (i.e., in an earlier timeframe than global virtual time), as discussed below. The handling of non-actor objects is discussed in the next section.

Global virtual time advances in synchronization with wall-clock time, and is the same at any given instant on all machines. Global virtual time is authoritatively maintained by a server, as described below, and may be propagated to all clients participating in the simulation using any conventional clock synchronization protocol, such as Network Time Protocol (NTP).

A key principle of the present invention is that in the absence of network errors (such as corrupted, lost, or excessively delayed packets), S(t) has the same value on every machine that is aware of the object, even while the precise physical ("wall-clock") time at which S(t) is calculated may vary from machine to machine. In the presence of network errors, S(t) may temporarily diverge but is eventually restored to consistency.

Figure 3:
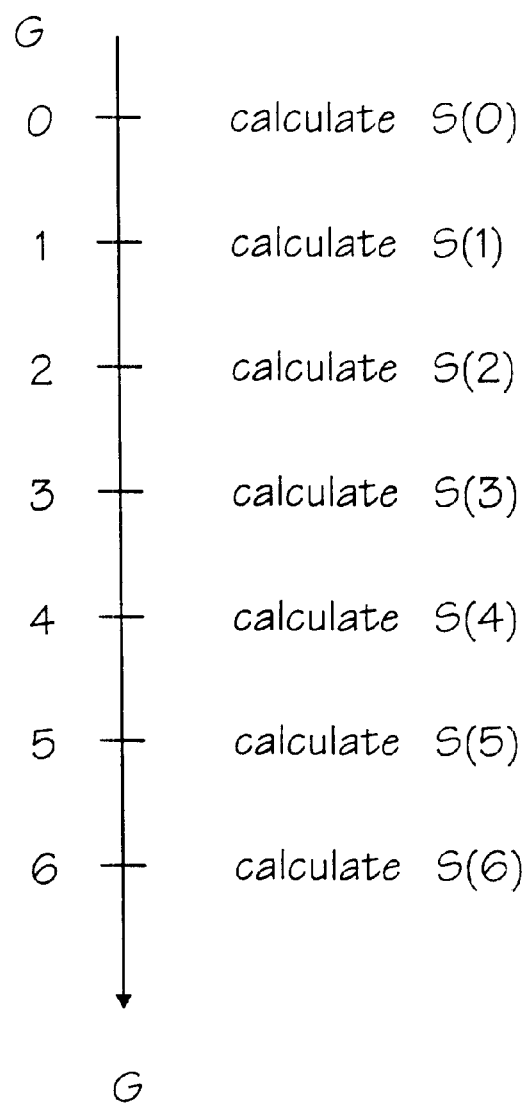
FIG. 3 illustrates a timeline associated with a server calculating states of an object S(t)

For each unit of state of an object S(t), there is one machine that authoritatively "owns" that unit of state. This machine is referred to as the server for S(t). Exactly which machine on the network is the server for S(t) may change occasionally. The server maintains global virtual time G. The server calculates the state of all objects for which it functions as server, up through time t=G. This process is shown in FIG. 3. In the figures which follow, time is depicted as progressing downward.

A user of a given client machine may have the privilege of influencing certain object states with commands. In particular, each user may be represented by a pilot "actor" A, which may be an avatar, that is heavily influenced by the user's commands. The server for a user's actor that authoritatively calculates A(t) (the state of actor A at time t) and the user's machine may be different machines. Accordingly, in one embodiment, the user's machine timestamps each user command with a virtual time value t1 and then sends a signal representing the timestamped command to the server for A. The timestamp is chosen so that when the command arrives at the server, the value of the timestamp is slightly ahead of (i.e., more advanced in time than) the global virtual time G. That is, if L is an estimated upper bound on the latency between the user's machine and the server, then the user's machine chooses t1=G+L. Note that the user's machine may estimate the latency using any of various well-known network latency estimation methods.

On receiving the timestamped command, the server immediately sends the command to all machines that are intended to track the state of the user's actor. The server calculates A(t1) when global virtual time G reaches t1, and this computation does not take into account commands timestamped later than t1. That is, a command timestamped t1 only affects A(t) when t≧t1.

The user's machine performs the same computation to calculate A(t) as that performed by the server, applying only commands timestamped t or earlier. Because all input to the computation of A(t) is the same on the server as that on the user's machine, and the algorithm to calculate it is identical, A(t) is the same on these machines. Thus, the server waits until global virtual time G reaches t1 to calculate A(t1); however, the user's machine calculates A(t1) when depicting the user's actor at time t1, which is usually shortly after sending the user commands timestamped t1 and, hence, significantly before G reaches t1. If t1 is computed as G+L when the command is issued, then the user's machine is depicting the object as shifted ahead in time from the server by L time units.

Figure 4:
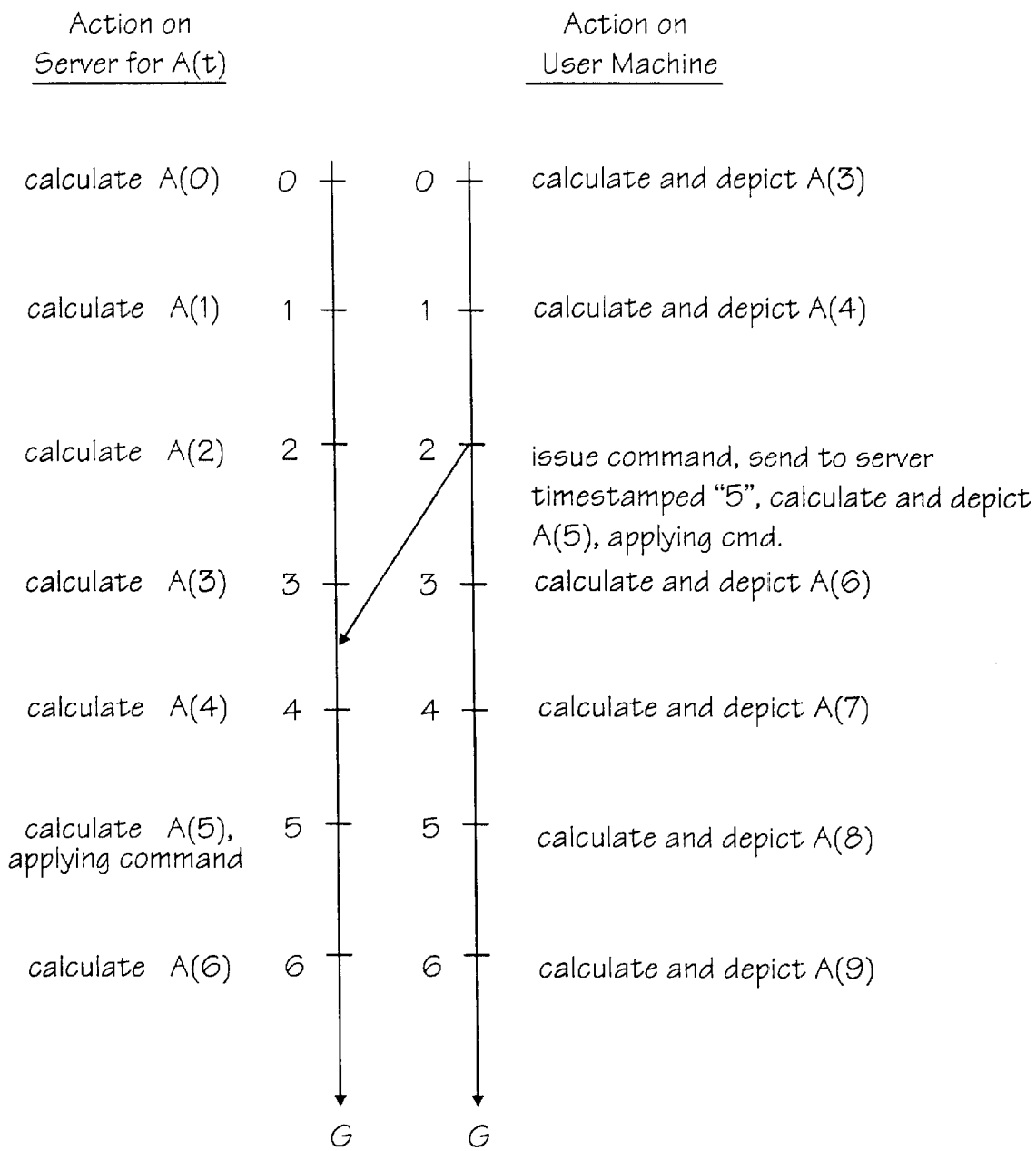
FIG. 4 illustrates the shifting forward in time of an object displayed on the user's machine, relative to the server, based on an estimate of network latency.

FIG. 4 illustrates an example of this process. In FIG. 4, the user's machine's estimate of one-way latency L is 3 time units. Thus, at time G=0, the user's machine displays A(3), and at time G=1, the user's machine displays A(4), and so forth. At time G=2, a local user input (UI) (command) is received at the user's machine; hence, at time G=2, the user's machine sends the command to the server (as represented by the arrow between the two vertical timelines) and displays A(5), applying the command. Note that in the illustrated example, the command is shown as being received by the server at some time between G=3 and G=4, and not at G=2+L (G=5); this indicates that the actual latency for transmission of the command is lower than the user machine's estimate of the maximum latency L, as will often be the case. It will be appreciated from FIG. 4 that by using this technique, the system achieves consistency, responsiveness, and integrity: the user and the server go through the same sequence of state A(t), the effects of the user's command are immediately apparent on the user's machine, and a compromised user's machine is not capable of affecting A(t) beyond what an unmodified user's machine could do.

Figure 5:
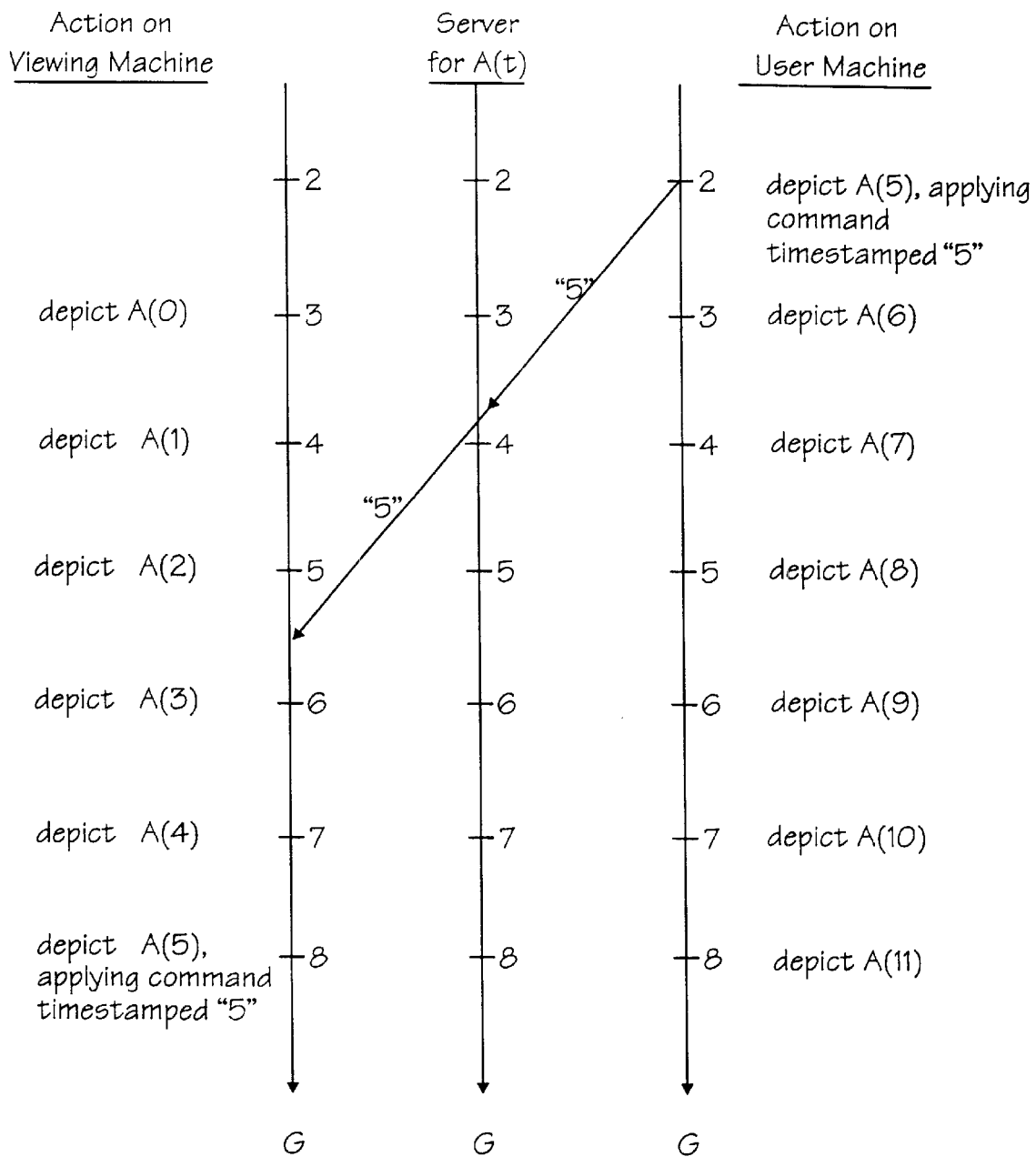
FIG. 5 illustrates the transmission of a timestamped command from the user's machine and the shifting back in time of an object displayed on the viewing machine.

As mentioned, when receiving the command, the server immediately redistributes the command (with timestamp) to the other viewing machines that are depicting the user's actor. These machines calculate A(t1) later, when G reaches t1+L (where L is the viewing machine's approximation of the latency from the server to the viewing machine itself.) That is, the viewing machine views the shadow actor as delayed in time by L. FIG. 5 illustrates this process.

As shown in FIG. 5, at time G=2, the user's machine depicts A(5), applying a user command that is timestamped with a time value of "5". The user's machine depicts the user's actor (a pilot actor) shifted forward in time by 3 time units (i.e., A(5) is displayed at G=2), whereas on the viewing machine on which the object is a shadow actor, it is depicted shifted back in time by 3 time units (i.e., A(5) is displayed at G=8). As in the previous example, the actual latency during transmission of the command is shown as being less than the user machine's estimate. Thus, A(t) is calculated the same across all machines (consistency), the user's commands are immediately apparent to the user (responsiveness), and no modifications to the user's machine can affect A(t) beyond what the user could do with an unmodified machine (integrity).

Figure 6A:
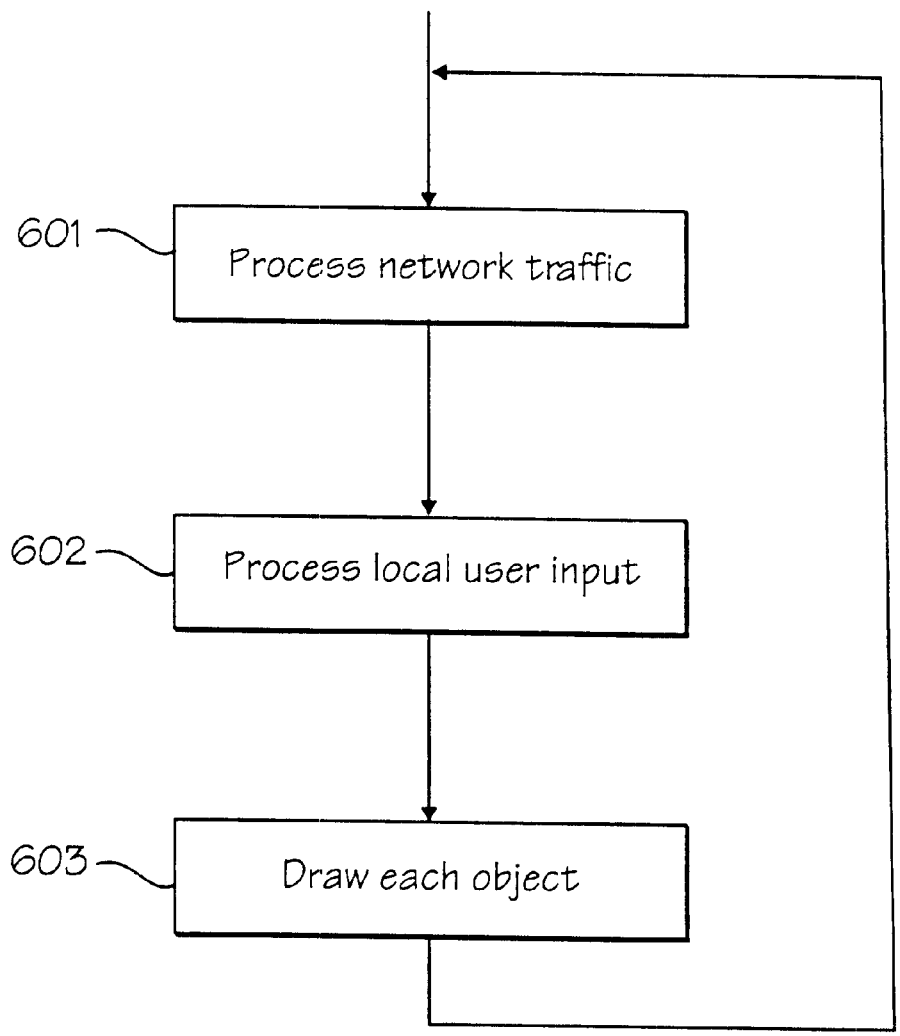
FIG. 6A is a flow diagram illustrating an overall process implemented on a client during a network-based simulation, in the presence of latency.

FIGS. 6A through 6D illustrate a process that may be performed on a client according to the technique described above. FIG. 6A illustrates the overall process. At block 601, the client processes any new network traffic, which may include remote commands and other messages. At block 602, the client processes any new local user input. At block 603, the client draws each object in the simulation, and the process then loops from block 601. This loop is ideally repeated many times per second.

Figure 6B:
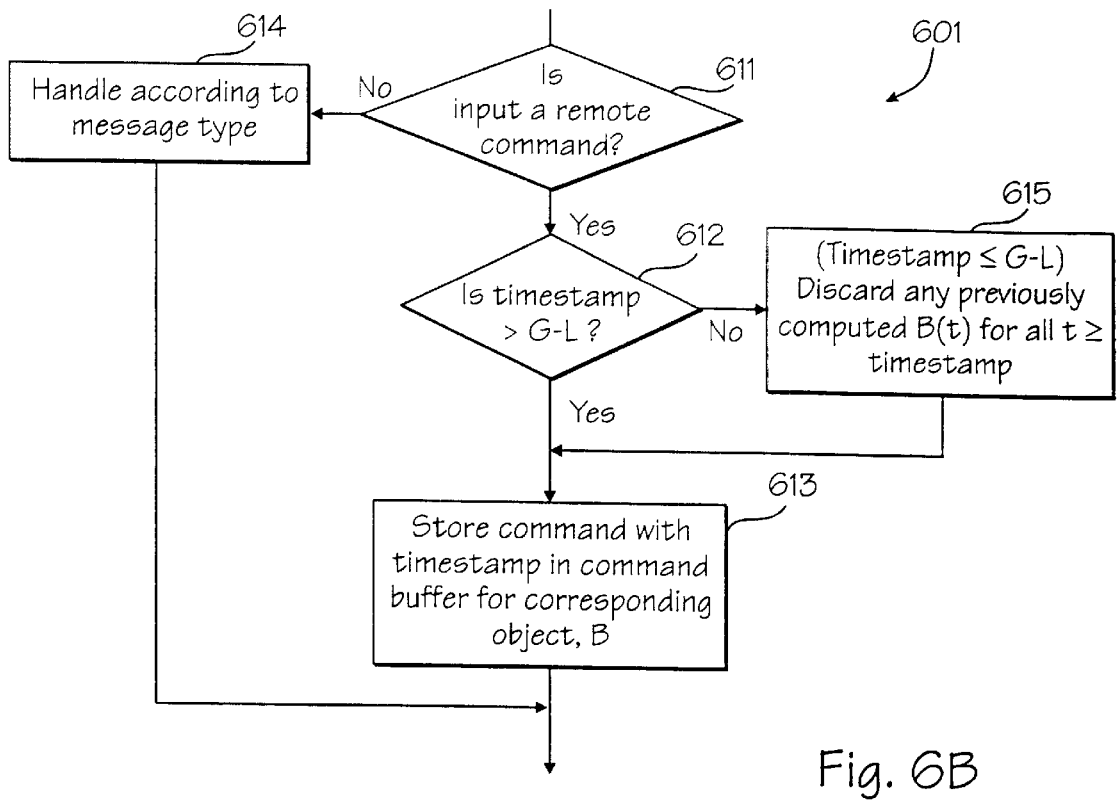
FIG. 6B is a flow diagram illustrating a process for processing network traffic.

FIG. 6B shows the processing of network traffic (block 601) in greater detail, according to one embodiment. At block 611, it is determined whether the input is a remote command. If not, the input is handled appropriately according to the type of message it is at block 614, and the process is then exited. If the input is a remote command corresponding to an object B, and if the timestamp associated with the command is greater than G–L (block 612), then at block 613 the command is stored with its timestamp in a command buffer corresponding to the object B. The process is then exited. If the input is a remote command, but the timestamp is less than or equal to G–L, then at block 615 any previously computed B(t) are discarded for all values of t greater than or equal to the timestamp. The command is then stored at block 613 in the command buffer for the object B with its timestamp, and the process is exited.

Figure 6C:
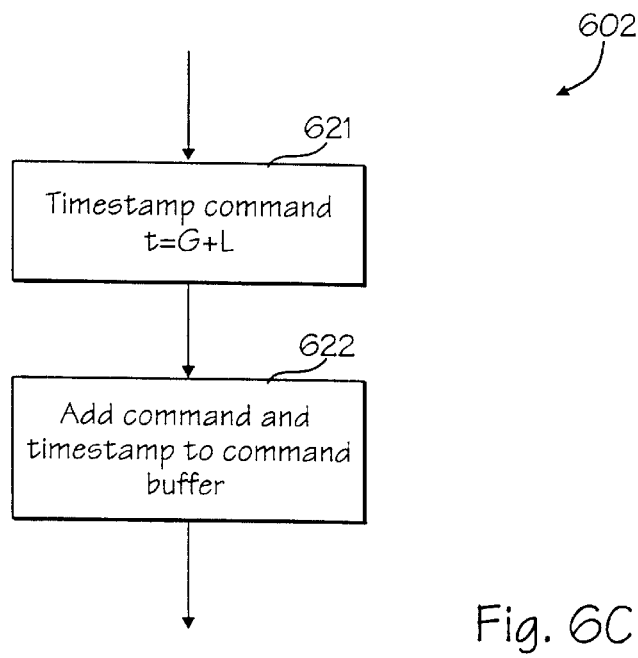
FIG. 6C is a flow diagram illustrating a process for processing local user inputs.

FIG. 6C shows in greater detail the processing of local user commands (block 602), according to one embodiment. At block 621, a local command associated with an object A is timestamped G+L. Then at block 622, the command is added with its timestamp to the command buffer for object A.

Figure 6D:
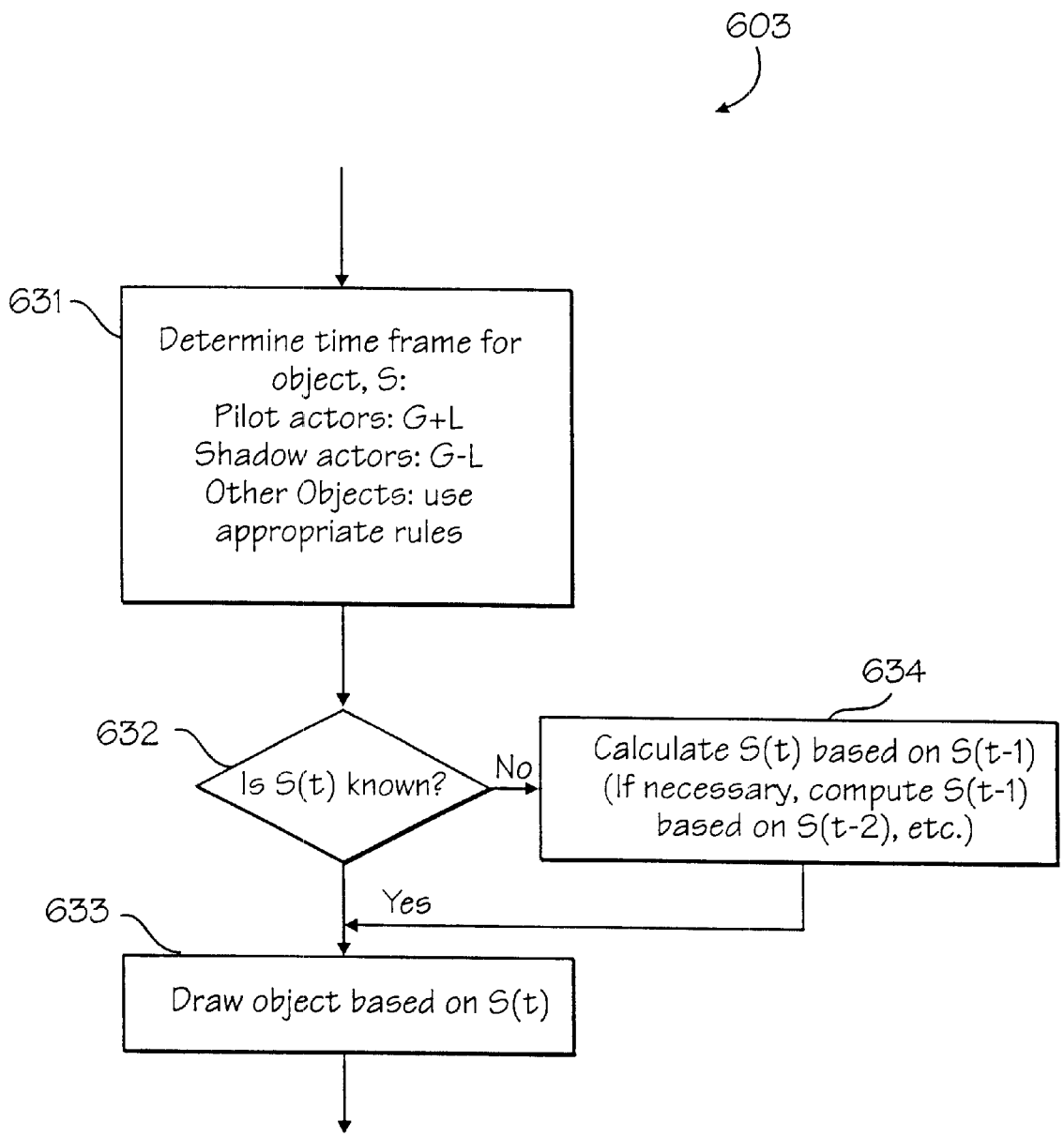
FIG. 6D is a flow diagram illustrating a process for drawing an object.

FIG. 6D shows in greater detail the process for drawing an object S (block 603), according to one embodiment. At block 631, the time frame in which the object S should be displayed is determined as described above. That is, for pilot actors the time frame is G+L, whereas for shadow actors the time frame is G–L. For other objects, such as obstacles, the time frame is determined according to appropriate predefined rules, examples of which are described below. If the state S(t) of the object S is already known (block 632), then at block 633 the object is drawn according to S(t), and the process is exited. If not, then S(t) is calculated based on the previous state S(t–1) at block 634. This may require calculation of S(t–1) based on S(t–2) if S(t–1) is not already known, and so forth. After S(t) is calculated, the object is drawn based on S(t) at block 633, and the process is exited.

Referring again to FIG. 5, note that a user machine's command message to the server may be lost, corrupted, or delayed past time G+L (time 5 in FIG. 5). In these cases, the message is discarded, and A(5) on the server is now different from the A'(5) calculated on the user's machine. Without additional action, this inconsistency persists and may compound, ultimately resulting in unbounded inconsistency. To avoid this, the server periodically resynchronizes A(t) by sending a repair message (t1,A(t1)) to all clients.

Figure 7:
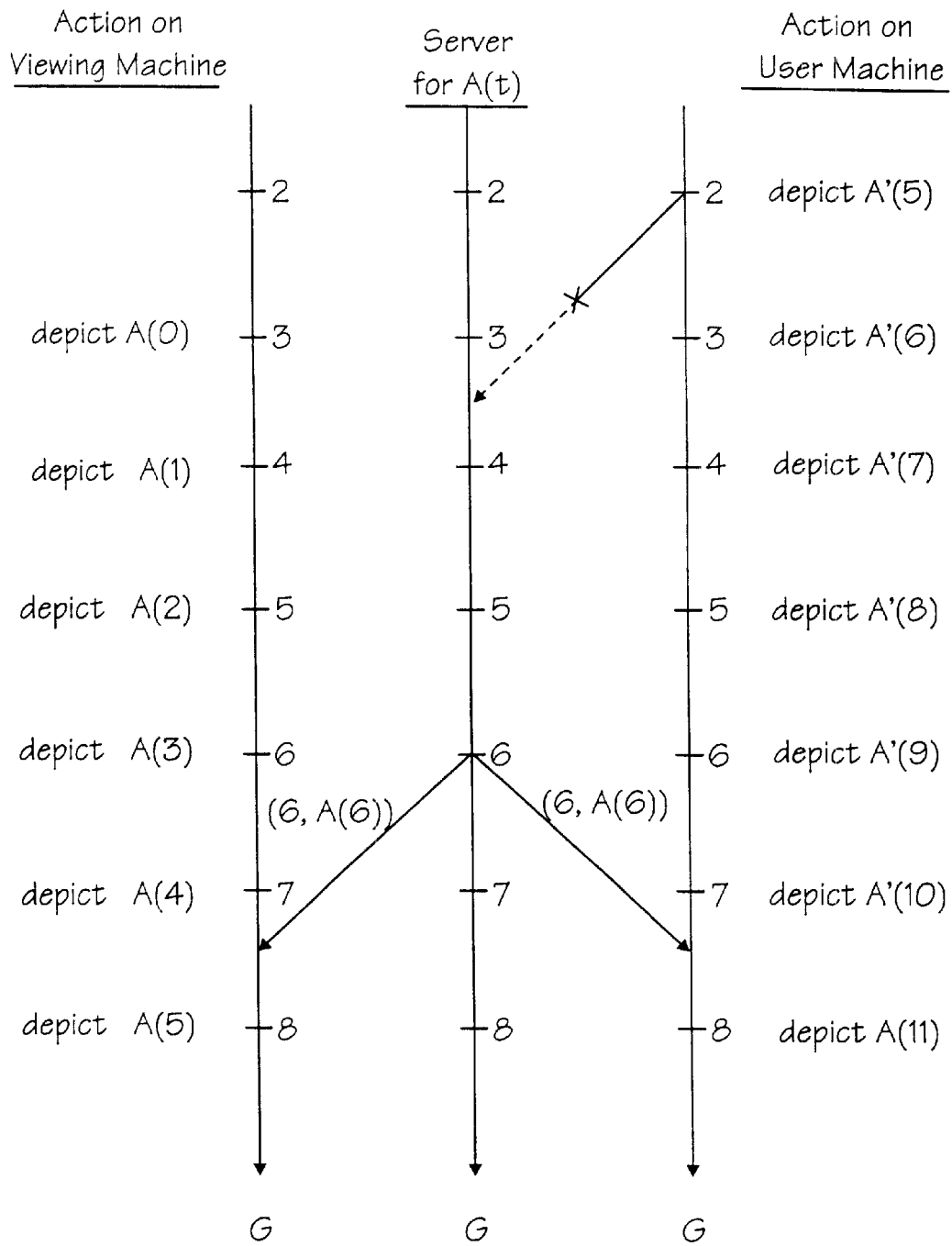
FIG. 7 illustrates a command from the user's machine being lost and the transmission of synchronization messages from the server to repair inconsistency due to such loss.

An example of this messaging technique is shown in FIG. 7. In FIG. 7, a user command message for time 5 is lost en route from the user's machine to the server (as denoted by the "X" symbol). Because the user's machine predicts that the message will be received and processed by the server at time 5, it calculates the object's state based on the command being applied; this state is denoted A'(t) above, and diverges from the server's state A(t), because A(t) is calculated without applying the user's command. At time t=6, the server sends to all clients a synchronization message, or "repair" message, the contents of which are (t, A(t)), i.e., the time and the state of a given object (or multiple objects) at that time. In the example of FIG. 7, the repair message is (6,A(6)). The user machine then recalculates A(7) from A(6), A(8) from A(7), and so on, so that it depicts the correct A(11) after receiving the repair message. The viewing machine records A(6), using that state instead of calculating A(6) itself when depicting A(6); this mechanism handles the case that the user command was lost between the server and the viewing machine.

Figure 8:
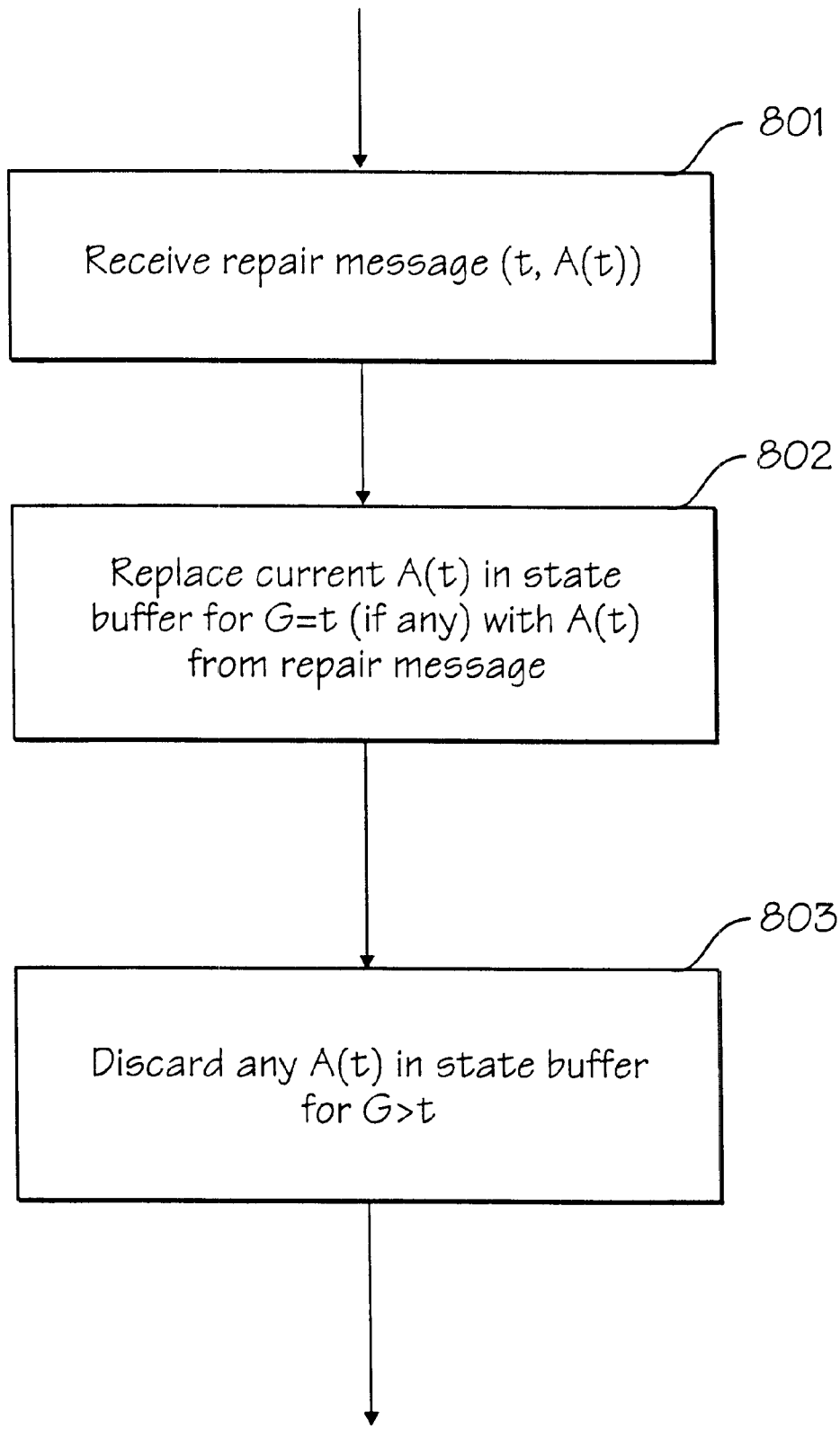
FIG. 8 is a flow diagram illustrating a process for handling a repair message during a network-based simulation.

FIG. 8 is a flow diagram illustrating a process for handling a repair message on a client. At block 801 the client receives a repair message (t,A(t)) relating to object A. At block 802 the client then replaces any A(t) that is already stored in A's state buffer for global virtual time G equal to t, with the A(t) specified in the repair message. The client then discards any A(t) in the state buffer for G greater than t at block 803.

In one embodiment, instead of immediately displaying the correct A(11), the user's machine gradually interpolates between A'(t) and A(t) (starting at time t=11) to avoid an unappealing "snapping" effect that may arise when instantaneously correcting from A'(10) to A(11).

In an alternative embodiment, instead of sending the complete state A(t) in synchronization messages, the server sends a digest of that state. The digest of state is a relatively small number of bits that includes less than all of the information in, but is nonetheless representative of, the object's full state. For example, such digest may be in the form of a checksum or Cyclic Redundancy Check (CRC) representation of the object's full state. Each client machine compares the received digest to the digest of its own computed state A'(t) and takes no action if they match. If the digests do not match, however, the client requests a retransmission of A(t) (the full state) from the server or a trusted server proxy. This approach conserves bandwidth in the expected case that divergence is uncommon, while degrading time-to-repair when divergence occurs (because of the possibility that multiple digests may be required to detect divergence, and the extra round-trip to fetch the state repair.)

2. Obstacles

An object that is not directly influenced by user commands is referred to as an "obstacle". Like actors, obstacles are characterized by a state function S(t) that is authoritatively computed on the server and it is also computed on clients. In a traditional approach to distributed obstacles, the server sends the value of S. The client receives the value, discards its old data on the obstacle's state, replaces that data with this new S, and displays that S immediately. As an enhancement, a traditional system may interpolate between old state and new state. This approach suffers from delay, and also suffers either inconsistency (if updates to S are sent infrequently) or high bandwidth usage (if sent frequently). The delay can be particularly bothersome when an actor interacts with the obstacle.

According to the present invention, the client handles obstacles similarly to actors. Each machine is able to calculate a state function S(t) over a range of time values. S(t) depends only on S(t−1) and each O_i(t−1), where O_i is the state function for each object i that can affect the behavior of the obstacle S. When the client has exact information for S(t−1) and each O_i(t−1), it is able to calculate the exact value of S(t). Then, the client has flexibility to choose t to trade off between responsiveness and consistency.

Figure 9A:
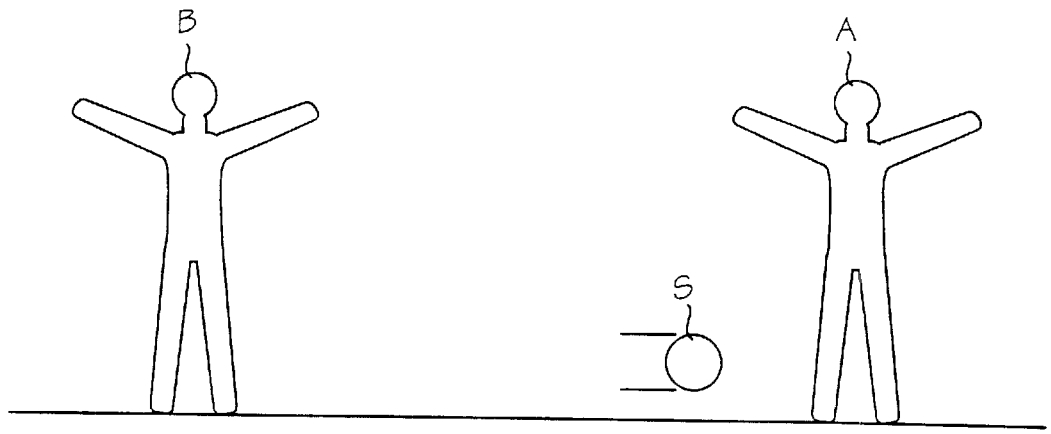
FIGS. 9A and 9B show two sample displays which include a pilot actor, a shadow actor, and an obstacle.
Figure 9B:
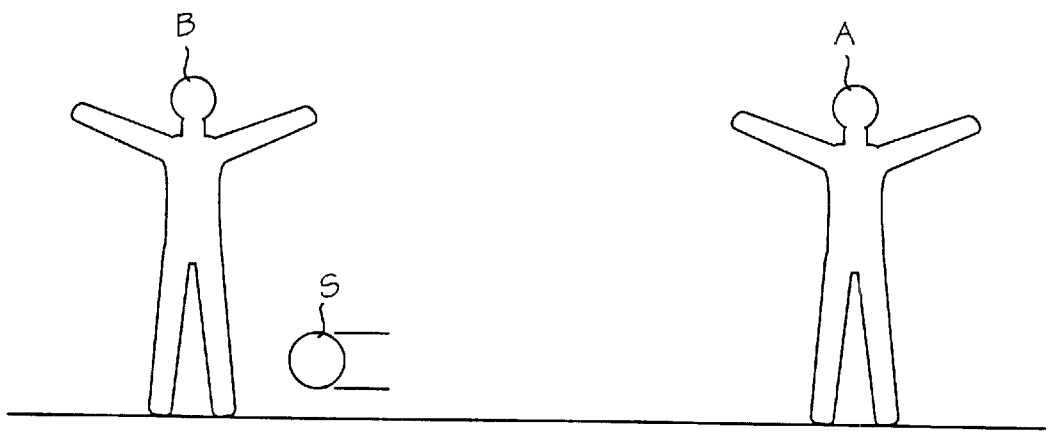

FIGS. 9A and 9B show a simple example of an interaction between actors and an obstacle. Specifically, a pilot actor A and a shadow actor B are shown interacting with an obstacle S, which may be a soccer ball, for example. Suppose the obstacle S is near a pilot actor A, as shown in FIG. 9A. Suppose further that the pilot actor A is able to take (or push on or otherwise affect) the obstacle S, so that S(t) depends on A(t−1). If consistency were the only goal, then the client could wait until receiving S(t) from the server before depicting it. However, as described above, the pilots actor is depicted on the client at a later time than its state is known on the server, so that approach would result in very poor responsiveness. To achieve responsiveness, the client depicts S at the same point in time that it depicts A; that is, the client depicts S(t) before S(t) has been calculated at the server, and long before S(t) arrives at the client. It does this by calculating S(t) from S(t−1) and A(t−1) in advance. When all inputs to S(t) are known in advance, this approach provides consistency and responsiveness.

As a second example, suppose the obstacle S is closer to the shadow actor B that is able to influence S and far from the pilot actor A, as shown in FIG. 9B. In this case, attempting to render S in A's timeframe would result in poor consistency, because B(t) is not known in advance; B(t) depends on remote user input. Thus, the client in this case does not attempt to calculate S(t) in advance. Instead, it waits until it has received B's user input (as described above), and once it knows B(t−1), then it calculates S(t) from S(t−1) and B(t−1). In this way, consistency is maintained. Responsiveness is not an issue in this example because the local actor is too far away to interact with S. Note that FIGS. 9A and 9B are not necessarily drawn to scale in terms of the relative distance between A and B.

As a third example, suppose the obstacle S is near both the pilot actor A and the shadow actor B. In this case, it is not possible to provide both consistency and responsiveness. To achieve responsiveness, S(t) must be depicted before B's user input for time t−1 has been received. To achieve consistency, B(t−1) must be taken into account when calculating S(t). Clearly it is not possible to do both (when network latency is greater than one timestep). In one embodiment, therefore, S is depicted in a timeframe that is nearer A's timeframe the closer S is to A, and farther from A's timeframe the farther S is from A, regardless of where B is, effectively trading off consistency for responsiveness. In another embodiment, B's proximity to S overrides A's, emphasizing consistency. In yet another embodiment, S's timeframe is chosen proportional to its relative distance to B and to A, to strike a balance between consistency and responsiveness.

In one embodiment, an affectable object (an object that can be affected by another object) identifies potential affector objects (objects which can affect it) based on the physical proximity of such objects to the affectable object. When the affectable object advances from state S(t−1) to state S(t), the affectable object queries each potential affector object for its state at time t−1. If the state of a potential affector object at time t−1 is not yet known, the affectable object assumes it is not affected by that potential affector object. When a potential affector object establishes or changes its state for time t−1, it then identifies any relevant affectable objects (objects which it can affect), based on their physical proximity, and notifies them that their state for time t might be incorrect.

From time to time, the state S(t) of an object on a client may diverge from the server's S(t). This may happen because of numerical error in calculating S(t) from S(t−1) and O_i(t−1), or because of misprediction of some O_i(t−1) on which S(t) depends. To repair such errors, the server periodically sends (t1,S(t1)) to the clients. The client checks to make sure it had the right S(t1), and if not, replaces it and invalidates all S(t) where t>t1. Note that this invalidation may not be perceivable to the user, since S(t) likely has not been drawn yet. Nonetheless, the interpolation technique mentioned above can be used to make any visible corrections smoother. In another embodiment, the server sends only (t1,D(S(t1))) where D is a digest function. When the digest does not match, the client requests a retransmission of S(t) from the server or trusted proxy.

3. Frame of reference

When a pilot's actor A and a shadow actor B are near each other yet depicted in different timeframes, the so-called "elevator problem" may arise. This problem is illustrated now with reference to FIGS. 10A and 10B. Suppose A and B are standing in a rising elevator E. The client system from which A is controlled must decide at what point in time to depict A, B, and E. As described above, this client system displays B in time delay, after B's user input has traveled across the network, yet displays A immediately as A's user input is received locally. Thus, if L is the one-way latency between server and client, and if A is depicted at time t, then B is depicted at time t−2L. If the elevator travels one meter per time unit, then B(t−2L) is 2L meters lower than A(t). This will look bad no matter where the elevator is depicted.

Figure 10A:
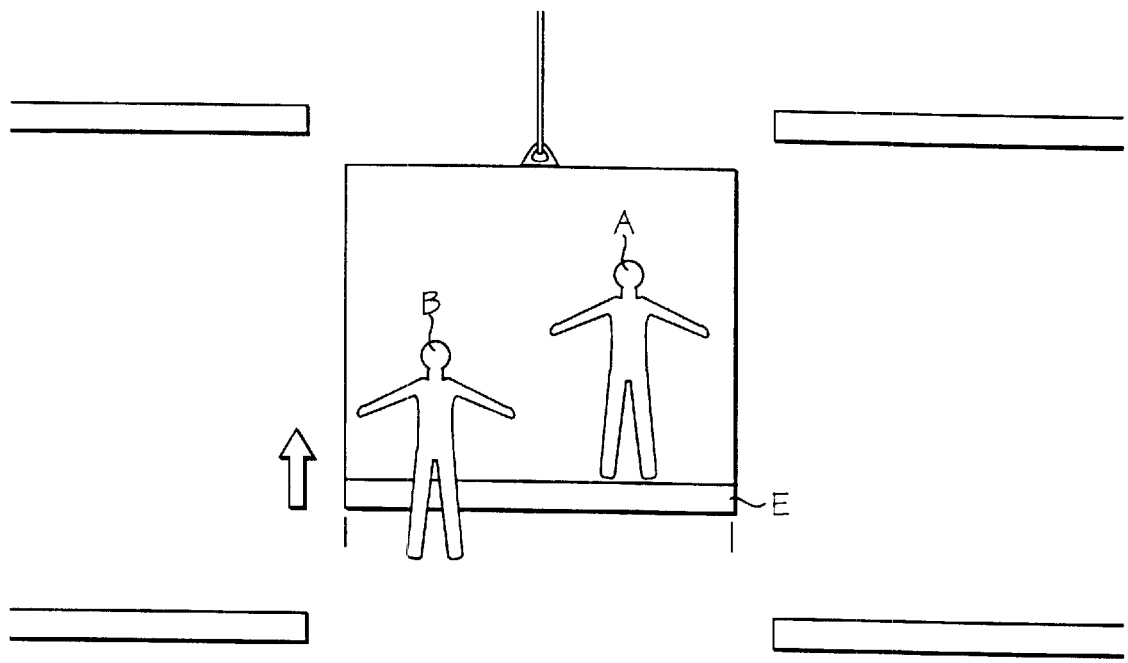
FIG. 10A shows a display in which a shadow actor is displayed in a time frame that is too early in relation to a pilot actor and a heavy object.

If E is depicted at E(t), as described in the previous section, then (as described so far), B is drawn below the floor of the elevator E, as shown in FIG. 10A.

Figure 10B:
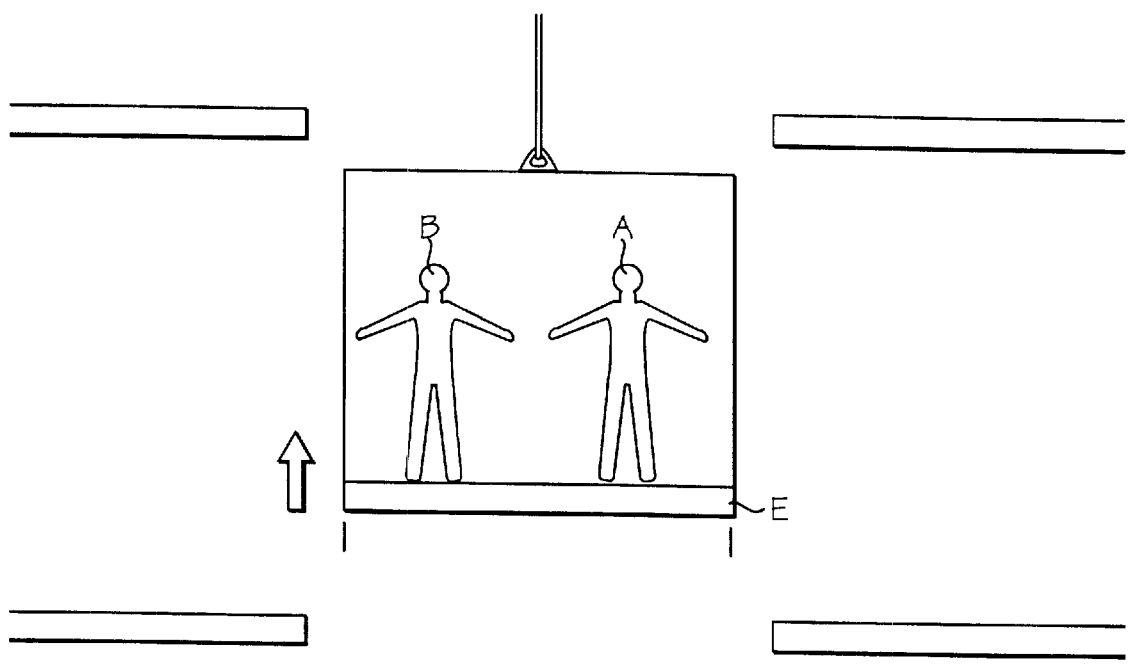
FIG. 10B shows a display in which the coordinates of the shadow actor have been transformed according to a frame of reference.

To solve this problem, the system maintains a frame of reference for each object as a function of time. This frame of reference may be considered part of the object's state function S(t). The frame of reference of an object S is an object that defines a region of space in which S exists. More specifically, the frame of reference is a region of space which dominates the position of the object S. The frame of reference is established, or "acquired", when S makes contact with the object that serves as its frame of reference. Thus, when B steps into the elevator and makes contact with E, the elevator E becomes B's frame of reference, because the elevator dominates B's position. For example, while located within the moving elevator E, B might jump up and down or move sideways, but B is nevertheless required to remain within the elevator until B exits the elevator at a designated floor. Thus, the elevator E "dominates" B's position. Then, when depicting B(t−2L), the clients calculates the position of B at time t−2L, and then asks the elevator E to transform that position from time t−2L to a position at the time when the elevator is depicted (say time t). The elevator E raises the position by 2L meters and returns the new position. What is meant here is that the elevator E (or other frame of reference) is an instantiation of an object class, and this class includes method calls to perform these functions when the elevator E is instantiated as an object. Alternatively, such method calls may be implemented in the shadow actor object, or in another object or external process. In this way, B is depicted as standing next to A as the elevator lifts them both, as shown in FIG. 10B, although the details of B's motion are time-delayed 2L time units for consistency and A's are not delayed for responsiveness.

Figure 10C:
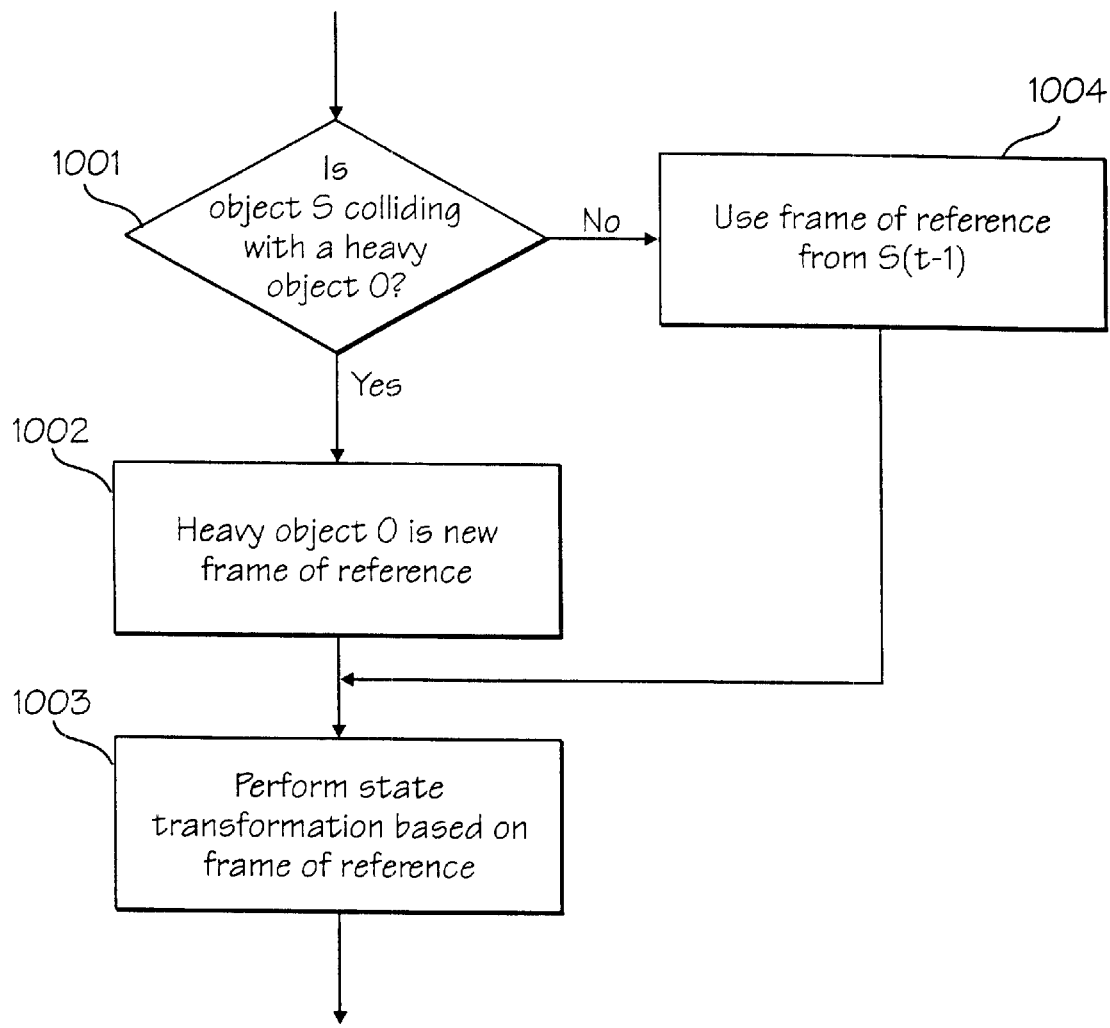
FIG. 10C is a flow diagram illustrating a process for determining a frame of reference for an object and for transforming coordinates of an actor according to the frame of reference.

FIG. 10C is a flow diagram illustrating a process for transforming coordinates of a shadow actor according to a frame of reference, as described above. Again, the frame of reference may be considered part of the object's state S(t) function. Hence, the process of FIG. 10C may be considered a subprocess of computing an object's state S(t) (block 634 in FIG. 6D). At block 1001, it is determined if the object S is colliding with a heavy object O which dominates the position of S. If not, then at block 1004, the frame of reference for S(t−1) is used as the frame of reference for S(t). Any necessary state transformation is performed based on the frame of reference at block 1003, and the process is then exited. If the object S is colliding with a heavy object O, then at block 1002 the heavy object is taken to be the new frame of reference. State transformation is then performed as necessary at block 1003, and the process is then exited.

4. Object interactions

Figure 11:
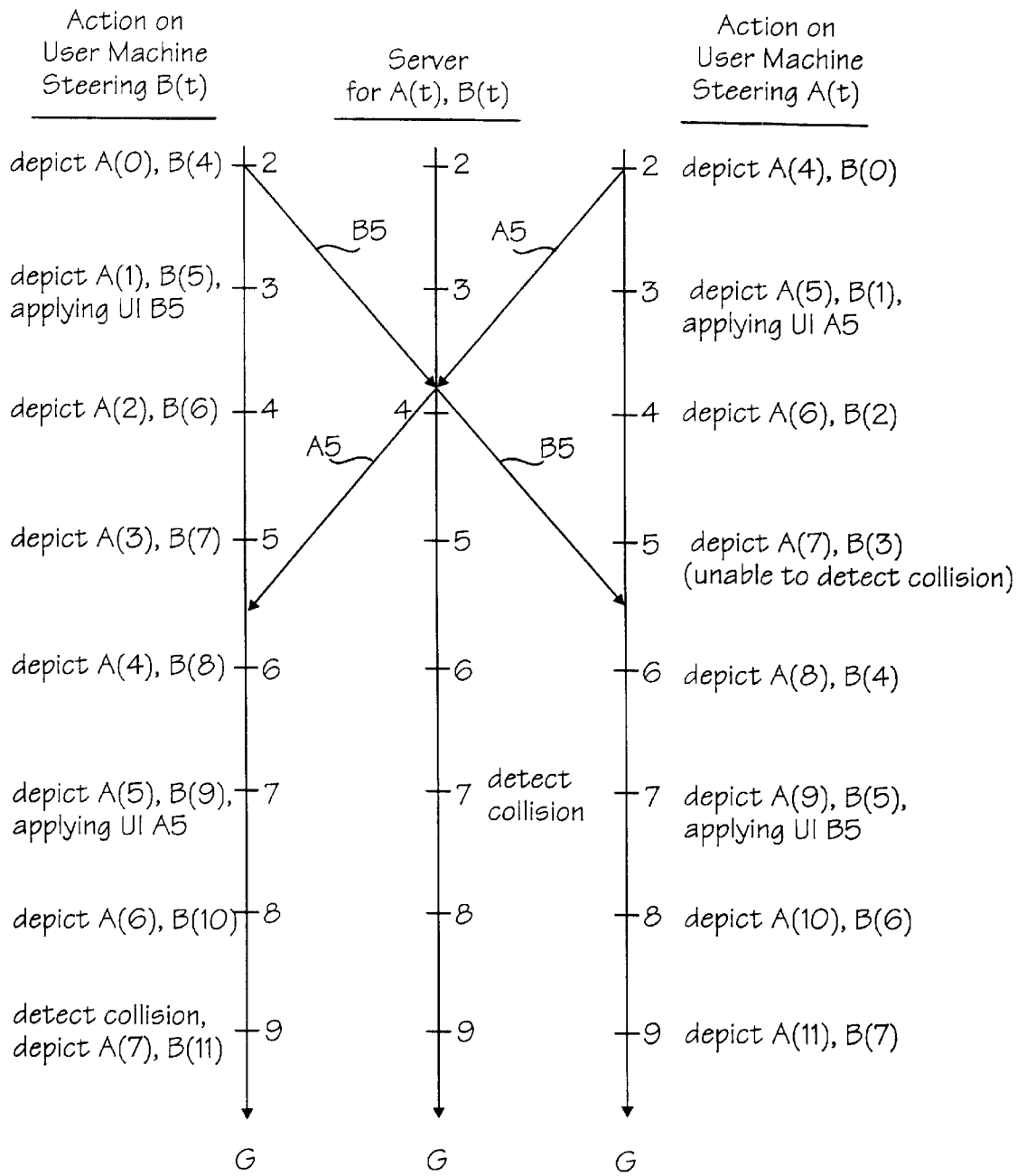
FIG. 11 shows timelines associated with a collision between two objects controlled from two remote machines.

It is possible that A(t) depends on A(t−1), user input timestamped t or earlier, and also on other objects O_i(t−1). For example, the fact that a pilot actor A and a bus B(t) collide at time t−1 has a significant effect on A(t). This is problematic if the user's machine does not know B(t−1) when calculating A(t). Consider the case that the bus B is being steered by a user on another machine. This scenario is illustrated in FIG. 11. User A inputs a user input (UI) command A5 at time G=2, while user B inputs a command B5 at time G=2.

Now, suppose that the avatar A and the bus B collide at time t=6, that is, A(6) and B(6) overlap. There is no problem on the server, which calculates A(7) based on the collision when t=7. On the user machine steering B(t), there is a minor anomaly that the bus appears to penetrate the avatar until A(7) is drawn (at which point the bus becomes A's frame of reference and all is well.) On the user machine steering A(t), however, there is a problem: when A(7) is calculated at, for example, global virtual time G=5, B(6) is not yet known. Any of the following three techniques can be used to handle this problem.

A first approach is to repair A once a correction (t,A(t)) (t≧7) is received on the user machine. Because many timesteps may pass before the repair is sent, however, this simple approach suffers from significant repair latency, a longer than necessary period of inconsistency.

An alternative is to detect the collision on A's machine after calculating B(6) (time G=8), and immediately invalidate and recompute A(t) for t>7. This alternative provides better (but imperfect) consistency at the cost of extra hit (collision) testing (presuming the bus would not otherwise need to test to see if it hit avatars).

Another alternative is to require that actors do not interact directly with other actors; that is, a bus or other object being controlled by one user may not physically collide with an avatar controlled by another user. This less functional alternative provides consistency at a low cost.

To achieve a good tradeoff between functionality and consistency, each object may be placed into one of three categories organized hierarchically. At the top of the hierarchy are "heavy" objects (such as trains, boulders, trees, etc.), which are objects that may not be responsively manipulated by users and respond physically to collisions only with other heavy objects. Next down in the hierarchy are actors, which may be responsively manipulated by users and respond physically to collisions with heavy objects. Note that actors do not respond physically to collisions with other actors. At the bottom of the hierarchy are "light" objects (e.g., a soccer ball), which respond physically to collisions only with actors and with heavy objects. Thus, one embodiment of the present invention takes the third alternative above in the actor/actor case; it is not allowed for a user to control a bus in a responsive manner, because it makes it impractical to accurately predict collisions with the bus on other machines. Similarly, it is not allowed that light objects affect actors because actors can affect light objects: if user A pushed light object O into user B, then it is practically impossible to have both sufficient responsiveness and accuracy. If the controls are responsive for A, then B does not learn that O was pushed into him until it is too late. This problem is illustrated in FIG. 12.

Figure 12:
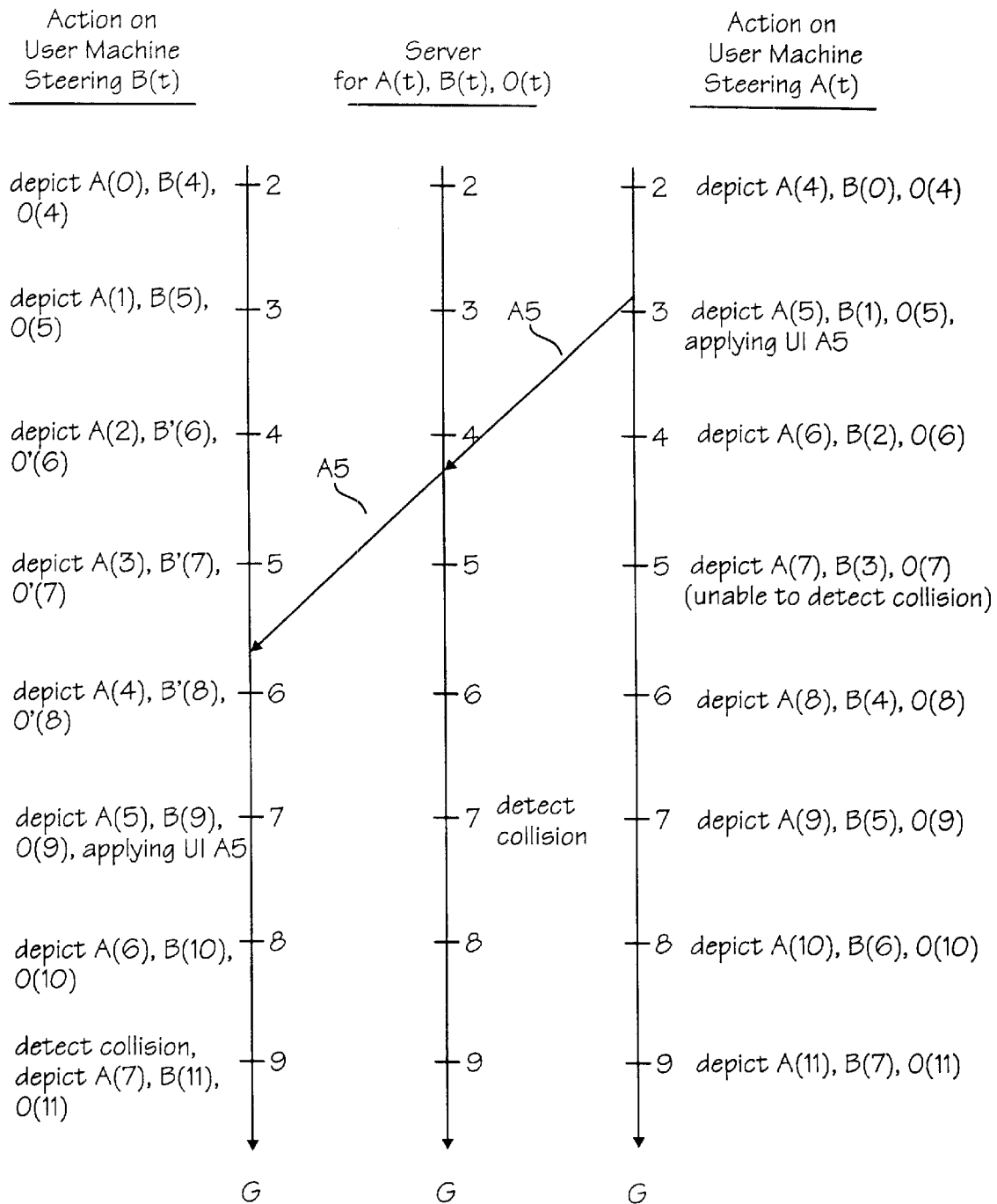
FIG. 12 shows timelines associated with an actor controlled by one machine causing a light object to collide with a second actor controlled by another, remote machine.

In FIG. 12, A pushes object O into B according to UI A5, displacing B at time 6. The machine of the user steering B(t) does not have UI A5 at time G=3 (when calculating B(6) and O(6)), so these values are calculated incorrectly. These incorrect values are labeled B' and O'. It is when B's machine finally processes UI A5 at time G=7 that it recognizes the collisions and corrects O(6) and B(6). This causes a consistency problem, because B' might be such that the actor B is moving out of the way, yet B(9) shows the result of B getting hit.

In the above-described embodiment, this problematic situation does not arise, however, because of the restriction that light obstacles do not affect actors. Thus, when A pushes O, O has no effect on B on either A's machine or B's machine. Note that this restriction is simply one way of implementing the present invention. For other embodiments, the functionality of A pushing O into B may be considered more important than the consistency/responsiveness tradeoff.

Figure 13:
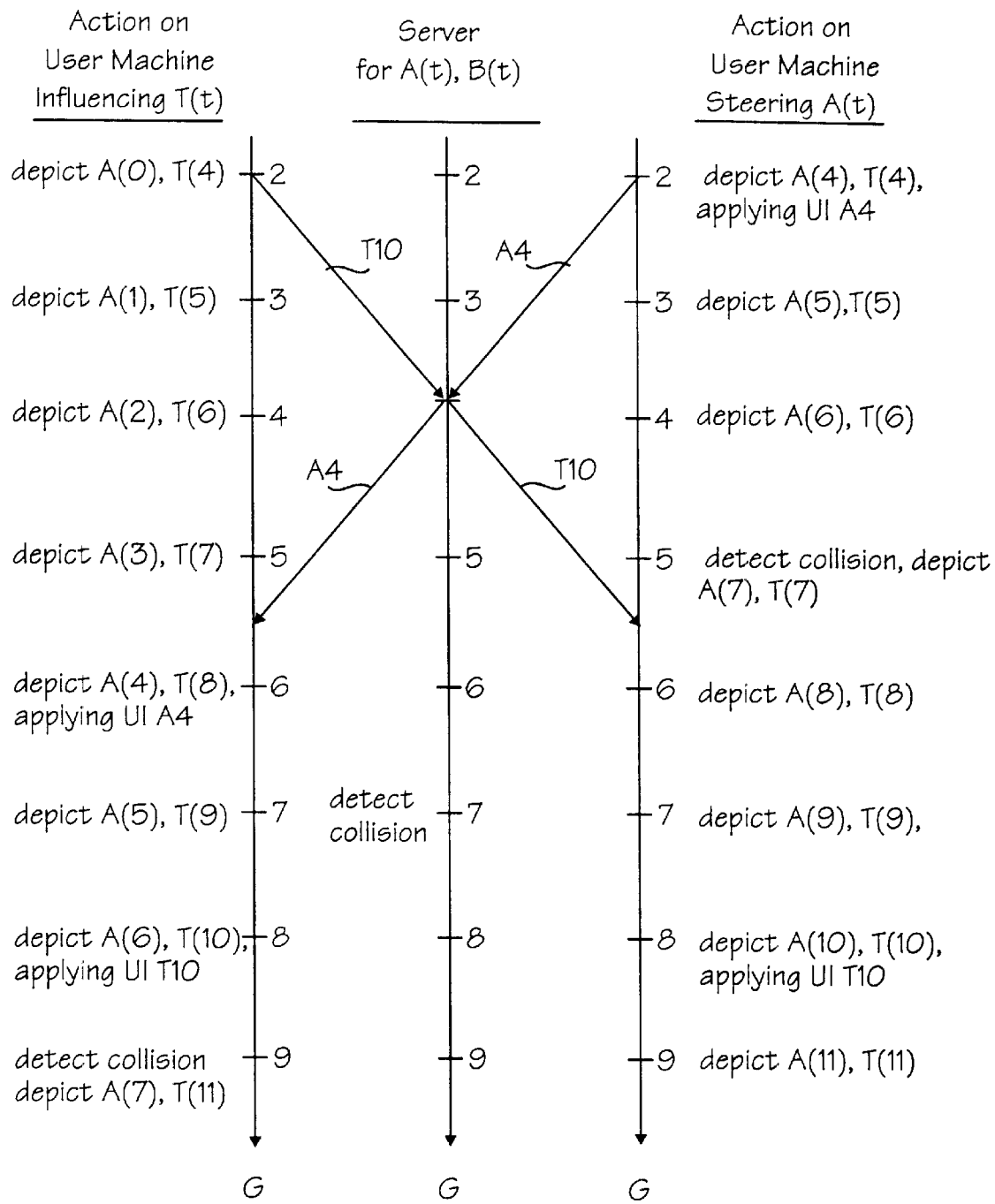
FIG. 13 shows timelines associated with one user influencing a heavy object while a second, remote user controls an actor.

Note also that a user may be allowed to control a heavy object, for example, a train T(t), with time lag. Thus, by sacrificing responsiveness to the train driver, consistency can be achieved for everyone, and responsiveness can be achieved for everyone except the train driver. An example of this process is shown in FIG. 13. A key aspect of this approach is that, if a user can influence a heavy object, then the user's commands are delayed locally. In the example, at time G=2, the user influencing the train T issues a command T10, such as "apply brakes", and the user controlling the avatar A issues a command A4, such as "walk forward". In the example of FIG. 13, L equals 2 and the maximum permitted one-way delay M equals 3. As described above, the avatar command is timestamped G+L (4 in this example) and sent to the server. Because the train is a heavy object, its command is timestamped G+L+2M (10 in this example) and sent to the server. This approach provides confidence that the train command will arrive at user A's machine before it is needed there.

Suppose, therefore, that the avatar A and the train T collide at time t=6, that is, A(6) and T(6) overlap. Again, there is no problem on the server, which calculates the effect of the collision on A, i.e. A(7), when t=7. Neither is there any problem on A's machine or on T's machine. That is, the collision is detected on A's machine at time t=5, when A's machine calculates A(7), and on T's machine at time t=9, when T's machine calculates A(7). Thus, a consistent result is achieved across all machines when calculating A(7), i.e., the effect of the collision on A.

Thus, a method and apparatus for consistent, responsive, and secure distributed simulation in a computer network environment have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of providing a simulation characterized by a plurality of objects, each object displayable on each of a plurality of processing systems on a network, the method comprising, in a local processing system of the plurality of processing systems:

advancing the simulation according to global virtual time; and at each of a plurality of points in global virtual time,
   computing a state of one of the objects for a time that differs from the current global virtual time; and
   displaying said one of the objects according to the computed state, wherein said one of the objects is controlled by a local user, and wherein said displaying comprises displaying said one of the objects according to a time that leads the global virtual time.

2. A method as recited in claim 1, further comprising:

determining a measure of network latency between the local processing system and a remote processing system on the network; and determining an amount of time by which the time that differs from the current global virtual time should differ from global virtual time, based on the measure of network latency.

3. A method as recited in claim 2, wherein the remote processing system maintains a true state of said one of the objects.

4. A method as recited in claim 1, wherein said time leads global virtual time by an amount of time based on a network latency between the local processing system and a remote processing system that maintains a true state of said one of the objects.

5. A method of providing a simulation characterized by a plurality of objects, each object displayable on each of a plurality of processing systems on a network, the method comprising, in a local processing system of the plurality of processing systems:

advancing the simulation according to global virtual time; and at each of a plurality of points in global virtual time,
   computing a state of one of the objects for a time that differs from the current global virtual time; and
   displaying said one of the objects according to the computed state, wherein said one of the objects is controlled by a remote user, and wherein said displaying comprises displaying said one of the objects according to a time that lags the global virtual time.

6. A method as recited in claim 5, wherein said time lags global virtual time by an amount of time based on a network latency between a first remote processing system operated by the remote user and a second remote processing system that maintains a true state of said one of the objects.

7. A method of providing a simulation characterized by a plurality of objects, each object displayable on each of a plurality of processing systems on a network, the method comprising, in a local processing system of the plurality of processing systems:

advancing the simulation according to global virtual time; and at each of a plurality of points in global virtual time,
   computing a state of one of the objects for a time that differs from the current global virtual time; and
   displaying said one of the objects according to the computed state, wherein:
   said one of the objects is controlled by a local user;
   said displaying comprises displaying said one of the objects according to a first time that leads the global virtual time;
   the method further comprises displaying a second one of the objects controlled by a remote user according to a second time that lags the global virtual time.

8. A method of providing a simulation characterized by a plurality of objects, each object displayable on each of a plurality of processing systems on a network, the method comprising, in a local processing system of the plurality of processing systems:

advancing the simulation according to global virtual time; and at each of a plurality of points in global virtual time,
   computing a state of one of the objects for a time that differs from the current global virtual time; and
   displaying said one of the objects according to the computed state, wherein a remote processing system maintains a true state of the object, wherein said computing comprises performing a computation of the state of the object according to a point in global virtual time, and wherein the computation is essentially identical to a computation of the state of the object that will be subsequently performed by the remote processing system for said point in global virtual time.

9. A method of providing a simulation characterized by a plurality of objects, each object displayable on each of a plurality of processing systems on a network, the method comprising, in a local processing system of the plurality of processing systems:

advancing the simulation according to global virtual time;

at each of a plurality of points in global virtual time, computing a state of one of the objects for a time that differs from the current global virtual time, and displaying said one of the objects according to the computed state;

receiving a repair message from a remote processing system, the repair message including a true state of the object and a global virtual time value associated with the true state; and recomputing previously computed states of the object based on the repair message, for global virtual time values later than said global virtual time value.

10. A method of providing a simulation characterized by a plurality of objects, each object displayable on each of a plurality of processing systems on a network, the method comprising, in a local processing system of the plurality of processing systems:

advancing the simulation according to global virtual time;

at each of a plurality of points in global virtual time, computing a state of one of the objects for a time that differs from the current global virtual time, and displaying said one of the objects according to the computed state; and, receiving a message from the remote processing system, the message including a digest of the true state of the object for a point in global virtual time.

11. A method implemented in a client processing system of providing a simulation on a network of processing systems, the simulation characterized by a plurality of objects displayable by each of the processing systems, wherein a true state of each of the objects is maintained by a server on the network with respect to global virtual time, the method comprising:

displaying a first object controlled by a local user of the client processing system, in a first time frame that leads the global virtual time by an amount of time corresponding to an approximate upper bound on the latency between the local processing system and the server;

displaying a second object controlled by a user of a remote client processing system, in a second time frame that lags the global virtual time by an amount of time corresponding to an approximate upper bound on the latency between a remote client processing system and the server;

receiving a user input for controlling the first object;

associating a timestamp with the user input, the timestamp indicative of the first time frame;

transmitting a command signal to the server indicative of the user input and the timestamp; and receiving a state signal from the server, the state signal including an indication of a true state of the first object updated based on the command signal and a point in global virtual time associated with the updated true state.

12. A method as recited in claim 11, wherein the state signal is a repair message including a true state of the object and a global virtual time value associated with the true state; the method further comprising recomputing previously computed states of the object based on the repair message, for global virtual time values later than said global virtual time value.

13. A method as recited in claim 11, wherein the state signal is a digest of the true state of the object for a point in global virtual time.

14. A method implemented in a local processing system of providing a simulation characterized by a plurality of objects displayable by each of a plurality of processing systems on a network, the method comprising:

computing a true state of an object with respect to global virtual time, the object controlled by a user of a remote processing system on the network, the true state of the object differing, at a particular point in global virtual time, from a state of the object computed by the remote processing system at said particular point in global virtual time; and performing a computation of said true state of the object for a point in global virtual time, wherein the computation is essentially identical to a previously performed computation of the state of the object by the remote processing system for said point in global virtual time.

15. A method as recited in claim 14, wherein global virtual time is synchronous between the local processing system and the remote processing system.

16. A method implemented in a local processing system of providing a simulation characterized by a plurality of objects displayable by each of a plurality of processing systems on a network, the method comprising:

maintaining a true state of an object with respect to global virtual time, the object controlled by a user of a remote processing system on the network, the true state of the object differing, at each of a plurality of points in global virtual time, from a state of the object maintained by the remote processing system;

receiving a signal from the remote processing system indicative of a user input received from a user at the remote processing system for controlling the object, the signal further indicating a time value associated with the user input, wherein the time value leads a global virtual time at which the user input was received from the user; and updating the true state of the object based on the signal.

17. A method as recited in claim 16, wherein said maintaining the true state of the object comprises performing a computation of the state of the object according to a point in global virtual time, and wherein said computation is essentially identical to a previously performed computation of the state of the object by the remote processing system for said point in global virtual time.

18. A method as recited in claim 16, wherein said maintaining the true state of the object comprises performing a computation of the state of the object according to a point in global virtual time, and wherein said computation is essentially identical to a computation of the state of the object which will subsequently be performed by the remote processing system for said point in global virtual time.

19. A method as recited in claim 16, further comprising transmitting a state signal to the remote processing system, the state signal including an indication of the updated true state of the object and a point in global virtual time associated with the updated true state.

20. A method as recited in claim 16, wherein the true state of the object lags a time frame of the object as displayed on the remote processing system by an amount of time corresponding to a latency between the remote processing system and the local processing system.

21. A method as recited in claim 16, further comprising:

maintaining a true state of a second object with respect to global virtual time, the second object controlled by a user of a second remote processing system on the network, the true state of the second object differing, at each of a plurality of points in global virtual time, from a state of the second object maintained by the second remote processing system; and receiving a signal from a second remote processing system indicative of a user input received from a user at the second remote processing system for controlling the second object, wherein the true state of the second object lags a time frame of the second object as displayed on the second remote processing system by an amount of time corresponding to a latency between the second remote processing system and the local processing system.

22. A method as recited in claim 16, wherein said updating comprises updating the true state of the first object based on the signal when the global virtual time substantially matches the time value.

23. A method as recited in claim 16, further comprising transmitting a repair message to the remote processing system, the repair message including a true state of the object and a global virtual time value associated with the true state, the repair message for use by the remote processing system to recompute states of the object that have been previously computed by the remote processing system.

24. A method as recited in claim 16, further comprising transmitting a message to the remote processing system including a digest of the true state of the object for a point in global virtual time.

25. A method of providing a simulation characterized by a plurality of objects displayable by each of a plurality of processing systems on a network, the method comprising:
   maintaining a true state of each of the objects with respect to global virtual time, including
      maintaining a true state of a first object controlled by a user of a first client on the network, such that the true state of the first object lags a time frame of the first object as displayed on the first client;
      maintaining a true state of a second object controlled by a user of a second client on the network, the true state of the second object lagging a time frame of the second object as displayed on the second client;
   receiving a command signal from the first client indicating a user input received at the first client for controlling the first object and a timestamp associated with the user input, wherein the timestamp indicates a time that leads the global virtual time at which the user input was received; and
   updating the true state of the first object based on the command signal.

26. A method as recited in claim 25, further comprising transmitting a state signal to the first client and the second client, the state signal including an indication of the updated true state of the first object and a point in global virtual time associated with the updated true state.

27. A method as recited in claim 25, further comprising transmitting a message to the remote processing system including a digest of the true state of the object for a point in global virtual time.

28. A method as recited in claim 25, wherein the true state of the first object lags a time frame of the first object as displayed on the first client by an amount of time corresponding to an approximate upper bound on the one-way latency between the first client and the server.

29. A method as recited in claim 28, wherein the true state of the second object lags a time frame of the second object as displayed on the second client by an amount of time corresponding to an approximate upper bound on the one-way latency between the second client and the server.

30. A method as recited in claim 25, wherein said updating comprises updating the true state of the first object based on the command signal when the global virtual time substantially matches the time indicated by the timestamp.

31. A method of providing a simulation on a network of processing systems, the simulation characterized by a plurality of objects displayable by each of the processing systems, the method comprising:
   operating a server on the network to maintain global virtual time, wherein global virtual time is the same on each of the server, a first client, and a second client on the network;
   operating the server to maintain a true state of each of the objects with respect to global virtual time, including
      maintaining a true state of a first object controlled by a user of a first client on the network such that at any point in global virtual time, wherein the true state of the first object lags a time frame of the first object as displayed on the first client by an amount of time corresponding to an approximate upper bound on the one-way latency between the first client and the server;
      maintaining a true state of a second object controlled by a user of a second client on the network, such that at any point in global virtual time, wherein the true state of the second object lags a time frame of the second object as displayed on the second client by an amount of time corresponding to an approximate upper bound on the one-way latency between the second client and the server;
   receiving, at the server, a command signal from the first client indicating a user input applied at the first client for controlling the first object and a timestamp associated with the user input, wherein the timestamp indicates a time that leads the global virtual time at which the user input was applied;
   operating the server system to update the true state of the first object based on the command signal when the global virtual time substantially matches the time indicated by the timestamp; and
   operating the server to send a state signal to the first client and the second client, the state signal including an indication of the updated true state of the first object and a point in global virtual time associated with the updated true state.

32. A method as recited in claim 31, wherein the state signal includes a digest of the updated true state of the first object.

33. An apparatus for providing a simulation characterized by a plurality of objects displayable by each of a plurality of processing systems on a network, the apparatus comprising:
   means for computing a true state of an object with respect to global virtual time, the object controlled by a user of a remote processing system on the network, wherein at any given point in global virtual time, the computed true state of the object can differ from a state of the object computed by the remote processing system, but wherein the true state of the object computed for any given point in global virtual time is substantially identical to a state of the object subsequently or previously computed by the remote processing system to correspond to said point in global virtual time; and
   means for performing a computation of said true state of the object for a point in global virtual time, wherein the computation is essentially identical to a previously performed computation of the state of the object by the remote processing system for said point in global virtual time.

34. An apparatus as recited in claim 33, wherein global virtual time is synchronous between the local processing system and the remote processing system.

35. A method implemented in a local processing system on a network of providing a simulation characterized by a plurality of objects, each of the plurality of objects displayable on each of a plurality of processing systems on the network, the method comprising:

receiving a repair message from a remote processing system, the repair message including an indication of a true state of an object and a time value associated with the true state; and recomputing previously computed states of the object based on the repair message.

36. A method as recited in claim 35, wherein said recomputing comprises recomputing previously computed states of the object based on the repair message, for time values later than said global virtual time value.

37. A method as recited in claim 35, wherein the object is a user-controlled actor.

38. An apparatus for providing a simulation characterized by a plurality of objects, each object displayable on each of a plurality of processing systems on a network, the apparatus comprising:

means for receiving a repair message from a remote processing system, the repair message including an indication of a true state of an object and a time value associated with the true state; and means for recomputing previously computed states of the object based on the repair message.

39. An apparatus as recited in claim 38, wherein said means for recomputing comprises means for recomputing previously computed states of the object based on the repair message, for time values later than said global virtual time value.

40. An apparatus as recited in claim 39, wherein the object is a user-controlled actor.

41. A method implemented in a local processing system on a network of displaying objects in a simulation, the method comprising:

displaying an obstacle according to a current state of the obstacle;

displaying an actor which can interact with the obstacle according to a current state of the actor; and varying a time frame of the current state of the obstacle based on a positional relationship between the obstacle to the actor.

42. A method as recited in claim 41, wherein said varying comprises moving said time frame closer to a time frame of the current state of the actor as the obstacle moves closer to the actor.

43. A method as recited in claim 42, wherein the actor is controlled by a user of the local processing system, such that said varying comprises moving the time frame of the current state of the obstacle later in time as the obstacle moves closer to the actor.

44. A method as recited in claim 42, wherein the actor is controlled by a user of a remote processing system, such that said varying comprises moving the time frame of the current state of the obstacle earlier in time as the obstacle moves closer to the actor.

45. A method implemented in a local processing system on a network of displaying objects in a simulation, the method comprising:

computing a current state of a first actor controlled by a user of the local processing system;

computing a current state of a second actor controlled by a user of a remote processing system;

determining a time frame for a current state of an obstacle based on a displayed relative proximity of the obstacle to the first actor and the second actor, wherein both the first actor and the second actor can interact with the obstacle;

computing the current state of the obstacle according to the time frame; and displaying the obstacle, the first actor, and the third actor, each according to its current state.

46. A method of displaying objects in a simulation implemented on a distributed network, the method comprising:

computing a position of a first object, as displayed on a display device of a processing system on the network;

determining a frame of reference of the first object as a region which dominates the position of the first object;

determining when the first object acquires the frame of reference; and when the first object acquires the frame of reference, transforming the position of the first object from an original position associated with a first time frame to a new position associated with a time frame of the frame of reference.

47. A method as recited in claim 46, wherein the region corresponds to a second object displayed on the display device, which can affect the first object.

48. A method as recited in claim 47, wherein the first object is controlled by a first processing system on the network, and wherein the second object is controlled by a second processing system on the network that is remote from the first processing system.

49. An apparatus for displaying objects in a simulation implemented on a distributed network, the apparatus comprising:

means for computing a position of a first object, as displayed on a display device of a processing system on the network;

means for determining a frame of reference of the first object as a region in which the first object can exist;

means for determining when the first object contacts the frame of reference; and means for transforming the position of the first object from an original position associated with a first time frame to a new position associated with a time frame of the frame of reference, when the first object contacts the frame of reference.

50. An apparatus as recited in claim 49, wherein the region corresponds to a second object displayed on the display device, which can affect the first object.

51. An apparatus as recited in claim 50, wherein the first object is controlled by a first processing system on the network, and wherein the second object is controlled by a second processing system on the network that is remote from the first processing system.

52. A method of simulation of objects in a processing system, the method comprising:

advancing an affectable object from a first time point t−1 to a later time point t; and causing the affectable object to identify a second object which can affect the affectable object; and causing the affectable object to query a state of the second object at time t−1.

53. A method as recited in claim 52, further comprising using a result of the query to select a time frame at which the affectable object is to be currently displayed.

54. A method as recited in claim 52, further comprising, when the state of the second object is established or changed for time t−1:

causing the second object to identify relevant affectable objects; and causing the second object to notify the relevant affectable objects that their states for time t might be incorrect.

55. A method as recited in claim 52, further comprising causing the second object to identify the relevant affectable objects based on physical proximity.

56. A method of displaying objects in a simulation implemented on a distributed network, the method comprising:

defining a plurality of classes of objects for display during the simulation, wherein each class of displayable objects is defined by a different set of rules that governs which other classes of object said class can affect and which other classes of object can be affected by said class; and displaying an object of each of the plurality of classes concurrently on a display device of a processing system on the network.

57. A method as recited in claim 56, wherein one of the classes defines actors controlled by users of processing systems on the network, and wherein the other class or classes define objects other than actors controlled by users.

58. A method of displaying objects in a simulation implemented on a distributed network, the method comprising:

defining a first class of displayable objects to represent relatively large or heavy real-world objects;

defining a second class of displayable objects to represent user-controlled actors, such that objects of the second class can be affected by objects of the first class but are not permitted to affect objects of the first class; and defining a third class of displayable objects to represent relatively small or light real-world objects, such that objects of the third class can be affected by objects of either the first class or the second class but are not permitted to affect objects of either the first class or the second class; and concurrently displaying an object of the first class, an object of the second class, and an object of the third class on a display device of a processing system on the network.

59. An apparatus comprising:

means for defining a plurality of classes of objects for display during a simulation, wherein each class of displayable objects is defined by a unique set of rules that governs which other classes of object said class can affect and which other classes of object can be affected by said class; and means for displaying an object of each of the plurality of classes concurrently on a display device of a processing system on a network.

60. An apparatus as recited in claim 59, wherein one of the classes defines actors controlled by users of processing systems on the network, and wherein the other class or classes define objects other than actors controlled by users.

61. A method of maintaining a simulation distributed on a network, the simulation characterized by a plurality of objects, the method comprising:

maintaining a true state of each of the objects on a server on the network;

associating user commands sent from a client on the network to the server with timestamps; and performing essentially identical computations of object state on the server and the client to achieve essentially the same result on the server and the client, wherein corresponding computations on the client and the server are performed at different times.

62. A method as recited in claim 61, wherein the server sends messages that enable the client to detect divergence of a state of an object computed by the client from the true state of the object maintained by the server.

63. A method as recited in claim 62, wherein the messages have the form $(t, S(t))$, where $S(t)$ is the state of the object at time t.

64. A method as recited in claim 62, wherein upon establishing a preferred value for $S(t1)$, the client recalculates $S(t2)$, where t2 is a time later than a time t1, by replaying all user commands and resimulating all object interactions between times t1 and t2.

65. A method as recited in claim 62, wherein the messages have the form $(t, D(S(t)))$, where $D(S(t))$ is a digest of state of the object at time t.

66. A method as recited in claim 65, wherein upon detecting said divergence, the client requests that the server send the most recent object state.

67. A method as recited in claim 61, further comprising depicting objects on a given processing system on the network in different time frames, according to which processing system on the network controls each object.

68. A method as recited in claim 61, wherein the timestamp is calculated by:

synchronizing global virtual time with the server;

estimating a round-trip time between the client and the server; and sending a timestamp of global virtual time plus one-half the estimated round-trip time.

69. A method as recited in claim 61, wherein a time frame for displaying a pilot actor controlled from the client is selected to be the same as the timestamp placed on a user input most recently sent from the client to the server.

70. A method as recited in claim 61, wherein a time frame for displaying a shadow actor controlled from the client is selected by smoothing a plurality of timestamps on user input received for the shadow actor.

71. A method as recited in claim 61, wherein a time frame for displaying an obstacle is selected based on proximity of the obstacle to an actor.

72. A method as recited in claim 61 wherein a time frame for displaying an obstacle varies, from global virtual time plus one-half a round-trip latency between the client and the server when the object is close to a pilot actor, to global virtual time minus one-half the round-trip latency when the obstacle is far from the pilot actor.

73. A method as recited in claim 61, wherein a time frame for displaying an obstacle is selected based on a time frame of an object that most recently influenced the obstacle.

74. A method as recited in claim 61, wherein a time frame for displaying an obstacle is based on a time frame of an object that most recently influenced the obstacle and the distance of the obstacle to a pilot actor.

* * * * *